(12) United States Patent
Harada et al.

(10) Patent No.: US 10,084,180 B2
(45) Date of Patent: Sep. 25, 2018

(54) ACTIVE MATERIAL, NONAQUEOUS ELECTROLYTE BATTERY, BATTERY PACK, AND VEHICLE

(71) Applicant: Kabushiki Kaisha Toshiba, Minato-ku (JP)

(72) Inventors: Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 195 days.

(21) Appl. No.: 15/260,823

(22) Filed: Sep. 9, 2016

(65) Prior Publication Data
US 2017/0077495 A1   Mar. 16, 2017

(30) Foreign Application Priority Data

Sep. 14, 2015   (JP) ................. 2015-180367

(51) Int. Cl.
*H01M 4/131* (2010.01)
*H01M 4/485* (2010.01)
(Continued)

(52) U.S. Cl.
CPC .......... *H01M 4/131* (2013.01); *C01G 33/006* (2013.01); *C01G 39/006* (2013.01); *H01M 2/1077* (2013.01); *H01M 2/30* (2013.01); *H01M 2/348* (2013.01); *H01M 4/485* (2013.01); *H01M 10/0525* (2013.01); *C01P 2002/76* (2013.01);
(Continued)

(58) Field of Classification Search
CPC .... H01M 4/131; H01M 10/0525; H01M 2/30; H01M 2/348; H01M 2/1077; H01M 4/485; C01G 39/006; C01G 33/006
See application file for complete search history.

(56) References Cited

U.S. PATENT DOCUMENTS

2008/0078594 A1   4/2008 Harada et al.
2012/0107692 A1   5/2012 Harada et al.
(Continued)

FOREIGN PATENT DOCUMENTS

EP   2 503 625 A2   9/2012
EP   2 784 026 A1   10/2014
(Continued)

OTHER PUBLICATIONS

Extended European Search Report dated Nov. 18, 2016 in Patent Application No. 16187789.9.
(Continued)

*Primary Examiner* — Stewart A Fraser
(74) *Attorney, Agent, or Firm* — Oblon, McClelland, Maier & Neustadt, L.L.P.

(57) ABSTRACT

According to one embodiment, an active material including a monoclinic niobium-titanium composite oxide is provided. In the active material, a portion of niobium (Nb) or titanium (Ti) as a constituent element of $Nb_2TiO_7$ is substituted by an element. Here, the substitution of Nb or Ti satisfies any one of following formulas (1) to (3):

$$Ti(IV) \rightarrow 0.75M(V)+0.25M(I) \quad (1)$$

$$Ti(IV) \rightarrow 0.6M(VI)+0.4M(I) \quad (2)$$

$$Nb(V) \rightarrow 0.8M(VI)+0.2M(I) \quad (3),$$

where M(VI) is at least one of Mo and W, M(V) is at least one of Nb, Ta, and V, and M(I) is at least one of Na, K, Rb, and Cs.

17 Claims, 6 Drawing Sheets

(51) Int. Cl.

| | | |
|---|---|---|
| *C01G 33/00* | (2006.01) | |
| *H01M 2/10* | (2006.01) | |
| *H01M 2/30* | (2006.01) | |
| *H01M 2/34* | (2006.01) | |
| *H01M 10/0525* | (2010.01) | |
| *C01G 39/00* | (2006.01) | |

(52) U.S. Cl.
CPC ...... *C01P 2002/77* (2013.01); *C01P 2004/61* (2013.01); *C01P 2006/12* (2013.01); *C01P 2006/40* (2013.01); *H01M 2200/10* (2013.01); *H01M 2220/20* (2013.01); *Y02E 60/122* (2013.01)

(56) References Cited

U.S. PATENT DOCUMENTS

| | | | |
|---|---|---|---|
| 2012/0244442 A1 | 9/2012 | Harada et al. | |
| 2014/0295231 A1 | 10/2014 | Ise et al. | |
| 2015/0364758 A1* | 12/2015 | Harada | H01M 4/485 429/176 |
| 2016/0190569 A1* | 6/2016 | Sasakawa | H01M 4/136 429/221 |
| 2016/0276652 A1* | 9/2016 | Iwasaki | H01M 4/131 |
| 2016/0276662 A1* | 9/2016 | Ise | C01G 33/00 |

FOREIGN PATENT DOCUMENTS

| | | |
|---|---|---|
| JP | 2008-91079 A | 4/2008 |
| JP | 2010-287496 A | 12/2010 |
| JP | 2012-99287 A | 5/2012 |
| JP | 2012-199146 A | 10/2012 |

OTHER PUBLICATIONS

C.M. Reich, et al., Niobia Based Rutile Materials as SOFC Anodes, Fuel Cell, vol. 1, No. 3-4, 2001, pp. 249-255.

Madeleine Gasperin, "Affinement de la structure de $TiNb_2O_7$ et repartition des cations" Journal of Solid State Chemistry, vol. 53, 1984, pp. 144-147.

G. Larraz, et al., "Cubic phases of garnet-type $Li_7La_3Zr_2O_{12}$: the role of hydration" Journal of Materials Chemistry A, vol. 1, 2013, pp. 11419-11428.

Izumi Nakai, et al., "Funmatsu X sen Kaisetsu no Jissai" Reality of Powder X-Ray Analysis, X-Ray Analysis Investigation Conversazione, The Japan Society for Analytical Chemistry, 2002, 4 pages.

* cited by examiner

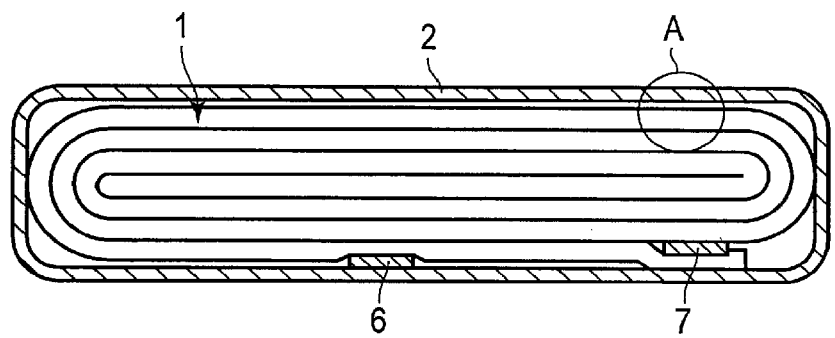
F I G. 3
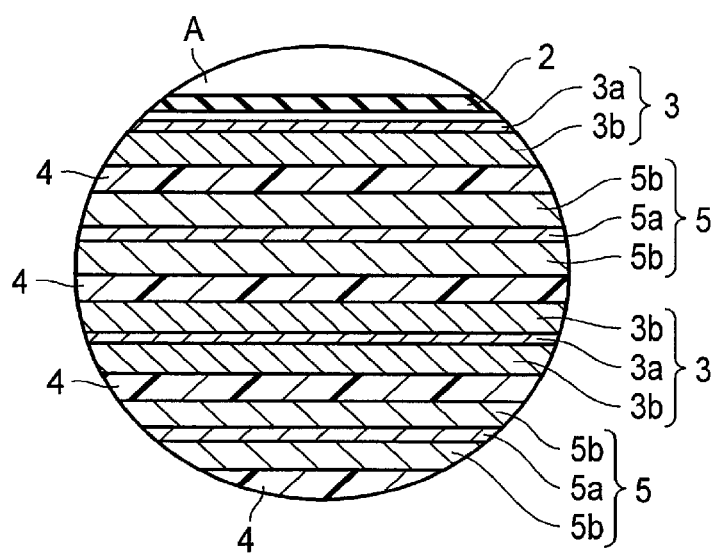
F I G. 4

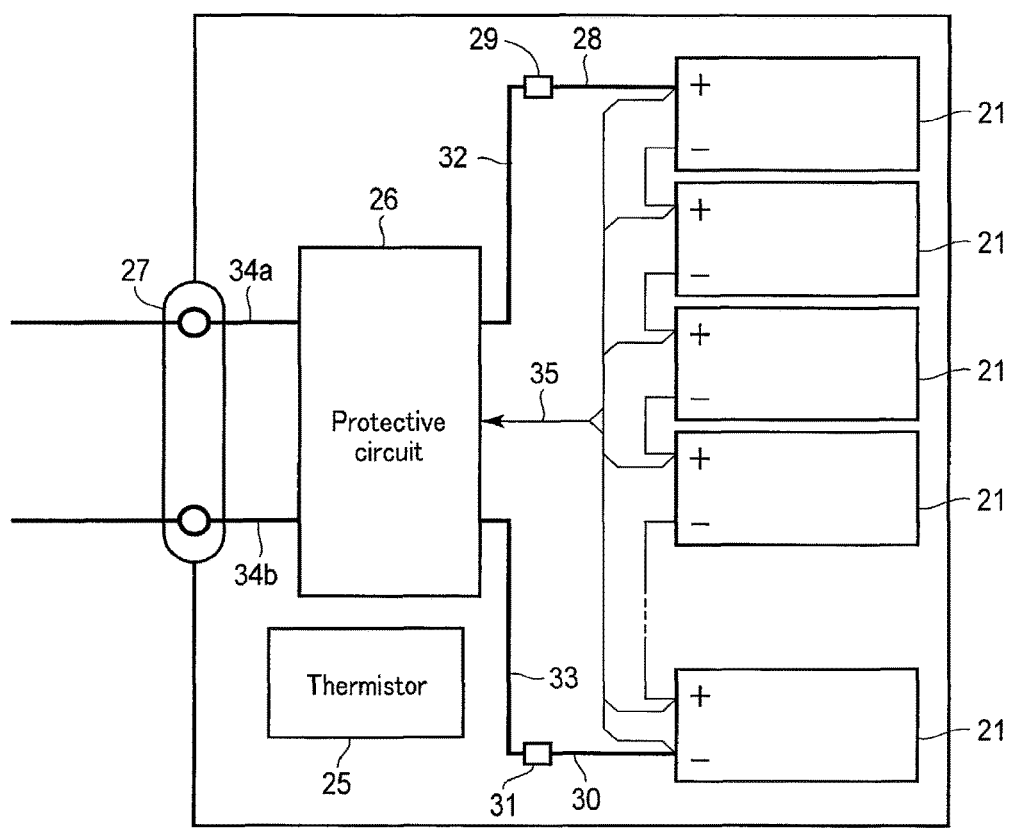
F I G. 8

ACTIVE MATERIAL, NONAQUEOUS ELECTROLYTE BATTERY, BATTERY PACK, AND VEHICLE

CROSS-REFERENCE TO RELATED APPLICATION

This application is based upon and claims the benefit of priority from Japanese Patent Application No. 2015-180367, filed Sep. 14, 2015; the entire contents of which are incorporated herein by reference.

FIELD

Embodiments described herein relate generally to an active material, nonaqueous electrolyte battery, battery pack, vehicle.

BACKGROUND

Recently, a nonaqueous electrolyte battery such as a lithium ion secondary battery has been developed as a high energy-density battery. The nonaqueous electrolyte battery is anticipated as a power source for vehicles such as hybrid automobiles and electric cars. Attention is also paid on them as a battery for fixed power sources for applications such as averaging out the amount of electricity consumption between day and night or for smart grids. Therefore, the nonaqueous electrolyte battery is demanded to have other good performances such as rapid charge-and-discharge performances and long-term reliability, as well. A nonaqueous electrolyte battery capable of rapid charge and discharge has the benefit that charging time is remarkably short, and is able to improve motive performances in hybrid automobiles. Furthermore, the battery can also efficiently recover regenerative energy from power of the vehicle.

Rapid charge-and-discharge becomes possible by rapid migration of electrons and lithium ions between the positive electrode and the negative electrode. However, when a battery using a carbon-based negative electrode is repeatedly subjected to rapid charge-and-discharge, dendrite of metallic lithium may sometimes precipitate on the electrode. Dendrites cause internal short circuits, and as a result raise concern that heat generation and/or fires may occur In light of this, a battery using a metal composite oxide as a negative electrode active material in place of a carbonaceous material has been developed. In particular, in a battery using titanium oxide as the negative electrode active material, rapid charge-and-discharge can be stably performed. Such a battery also has a longer life than those using a negative electrode with carbonaceous material.

However, compared to carbonaceous materials, oxides of titanium have a higher potential (is more noble) relative to metallic lithium. Furthermore, oxides of titanium have a lower capacity per weight. Therefore, a battery using an oxide of titanium as the negative electrode active material has a problem that the energy density is lower.

For example, the potential of the electrode using an oxide of titanium is about 1.5 V relative to metallic lithium and is higher (more noble) than that of the negative electrode with carbonaceous material. The potential of an oxide of titanium arises from the redox reaction between $Ti^{3+}$ and $Ti^{4+}$ upon electrochemical insertion and extraction of lithium, and is therefore electrochemically limited. There also is the fact that at a high electrode potential of about 1.5 V, rapid charge-and-discharge of lithium ions can be performed stably. It is therefore practically difficult to drop the potential of the electrode in order to improve the energy density.

On the other hand, considering the capacity per unit weight, the theoretical capacity of lithium titanate (anatase structure) is about 165 mAh/g, and the theoretical capacity of a lithium-titanium composite oxide such as $Li_4Ti_5O_{12}$ is about 180 mAh/g. On the other hand, the theoretical capacity of a general graphite based electrode material is 385 mAh/g and greater. Therefore, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In view of such circumstances, a new electrode material including titanium (Ti) and niobium (Nb) has been examined. Such materials are expected to have high charge-and-discharge capacities. In particular, a composite oxide represented by $TiNb_2O_7$ has a theoretical capacity exceeding 380 mAh/g; however, the substantial capacity of an electrode of $TiNb_2O_7$ is about low as 260 mAh/g, and has the problem that the charge-and-discharge life is short.

BRIEF DESCRIPTION OF THE DRAWINGS

FIG. 3 is a cross-sectional view of a flat type nonaqueous electrolyte battery of an example according to a second embodiment;

FIG. 4 is an enlarged cross-sectional view of portion A of FIG. 3;

FIG. 8 is a block diagram showing an electrical circuit of the battery pack of FIG. 7.

DETAILED DESCRIPTION

Figure 1:
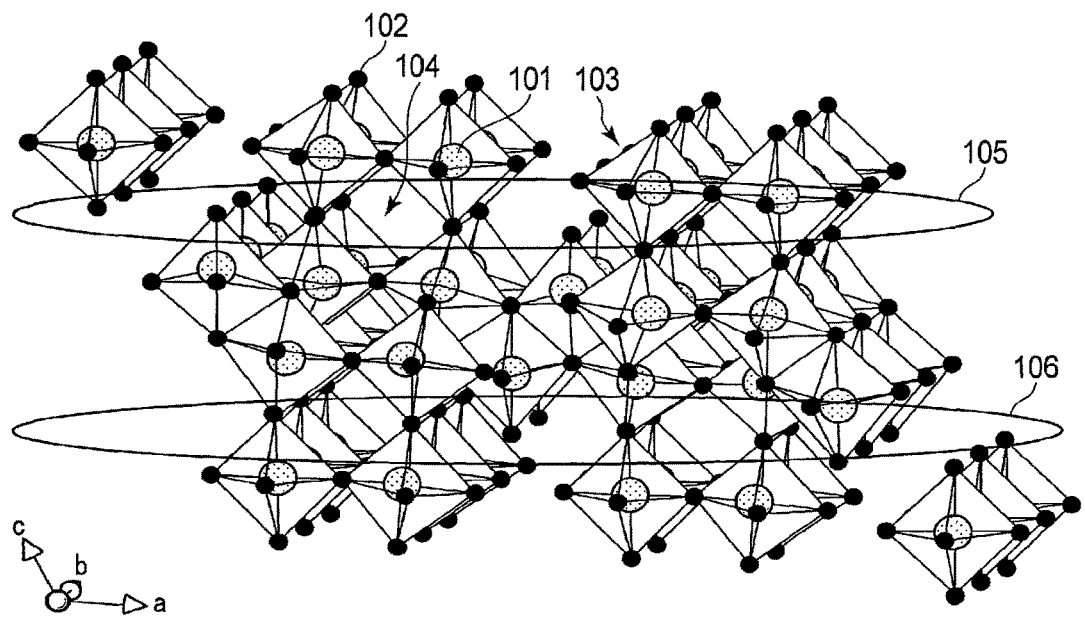
FIG. 1 is a schematic diagram showing a crystal structure of monoclinic $Nb_2Ti_{0.9}(Nb_{0.75}Na_{0.25})_{0.1}O_7$.

According to one embodiment, an active material including a monoclinic niobium-titanium composite oxide is provided. In the active material, a portion of niobium (Nb) or titanium (Ti) as a constituent element of $Nb_2TiO_7$ is substituted by an element. Here, the substitution of Nb or Ti satisfies any one of following formulas (1) to (3):

$$Ti(IV) \rightarrow 0.75M(V)+0.25M(I) \quad (1)$$

$$Ti(IV) \rightarrow 0.6M(VI)+0.4M(I) \quad (2)$$

$$Nb(V) \rightarrow 0.8M(VI)+0.2M(I) \quad (3),$$

where M(VI) is at least one of Mo and W, M(V) is at least one of Nb, Ta, and V, and M(I) is at least one of Na, K, Rb, and Cs.

In another embodiment, a nonaqueous electrolyte battery including a negative electrode including the above active material, a positive electrode, and a nonaqueous electrolyte is provided.

In yet another embodiment, a battery pack including the above nonaqueous electrolyte battery is provided.

In still another embodiment, provided is a vehicle onto which the above battery pack is mounted.

Hereinafter, the embodiments will be described with reference to the drawings.

First Embodiment

A battery active material according to the first embodiment includes a monoclinic niobium composite oxide, and in the active material, in a crystal lattice of a niobium-titanium composite oxide $Nb_2TiO_7$, a portion of niobium (Nb) at a niobium site or titanium (Ti) at a titanium site is substituted by an element M (M(VI), M(V), and M(I)), as represented by any one of the following formulas (1) to (3):

$$Ti(IV) \rightarrow 0.75M(V) + 0.25M(I) \quad (1)$$

$$Ti(IV) \rightarrow 0.6M(VI) + 0.4M(I) \quad (2)$$

$$Nb(V) \rightarrow 0.8M(VI) + 0.2M(I) \quad (3),$$

where M(VI) is at least one of Mo and W, M(V) is at least one of Nb, Ta, and V, and M(I) is at least one of Na, K, Rb, and Cs.

Specifically, in the above formulas (1) to (3), M(VI) may be either one of Mo and W, or a combination of both Mo and W. M(V) may be one of Nb, Ta, and V, or a combination of two or more of Nb, Ta, and V. M(I) may be one of Na, K, Rb, and Cs, or a combination of two or more of Na, K, Rb, and Cs.

Niobium-titanium composite oxides primarily exhibit a monoclinic crystal structure. As an example thereof, schematic diagrams of a crystal structure of monoclinic $Nb_2Ti_{0.9}(Nb_{0.75}Na_{0.25})_{0.1}O_7$ are shown in FIGS. 1 and 2.

Figure 2:
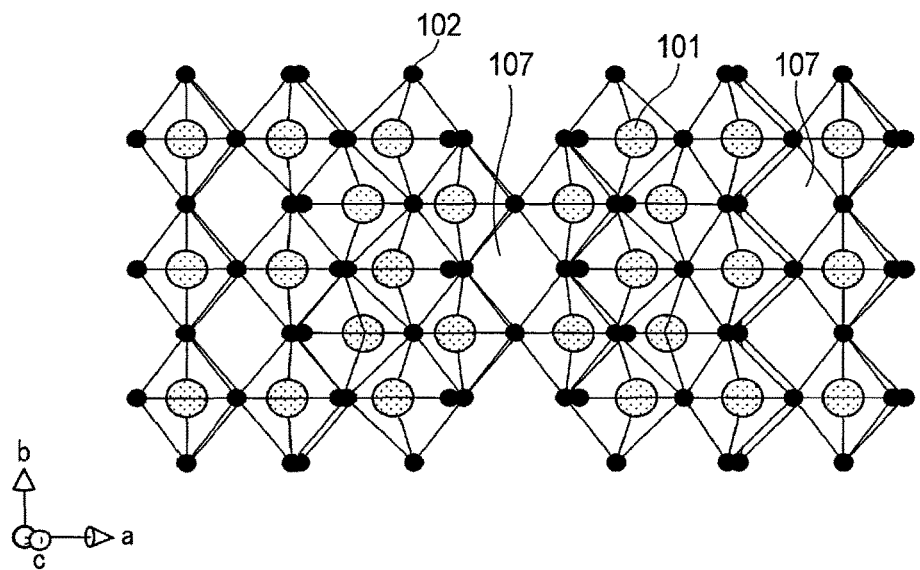
FIG. 2 is a schematic diagram of the crystal structure of FIG. 1 as viewed from another direction.

As shown in FIG. 1, in the crystal structure of monoclinic $Nb_2Ti_{0.9}(Nb_{0.75}Na_{0.25})_{0.1}O_7$, a metal ion 101 and an oxide ion 102 form a structural framework 103. The metal ion 101 indicate Nb ions, Ti ions, and Na ions randomly arranged within each crystal site in the crystal structure at a ratio of Nb:Ti:Na=2.075:0.9:0.025. The structural frameworks 103 are alternately arranged three-dimensionally, whereby a vacancy 104 exists among the structural frameworks 103. The vacancy 104 serves as a host for lithium ions. From 0 mol to a maximum of 5.0 mol of lithium ions can be inserted into the crystal structure. When 5.0 mol of lithium ions are inserted, the crystal structure can be represented as $Li_5Nb_2Ti_{0.9}(Nb_{0.75}Na_{0.25})_{0.1}O_7$.

In FIG. 1, a region 105 and a region 106 are portions having two-dimensional channels in [100] and [010] directions. As shown in FIG. 2, in the crystal structure of monoclinic $Nb_2Ti_{0.9}(Nb_{0.75}Na_{0.25})_{0.1}O_7$, a vacancy 107 exists in a [001] direction. The vacancy 107 has a tunnel structure favorable for the conduction of lithium ions, and the vacancy 107 serves as a conductive path in the [001] direction connecting the region 105 and the region 106. This conductive path makes it possible for the lithium ions to migrate between the region 105 and the region 106.

The niobium-titanium composite oxide included in the battery active material in this embodiment preferably has a crystal structure having a space group C2/m symmetry and an atomic coordination described in Journal of Solid State Chemistry 53, pp. 144-147 (1984). The embodiment is not limited to this, however.

In the above crystal structure, when lithium ions are inserted in the vacancy 104, the metal ion 101 composing the skeleton is reduced to a valence of 3, thereby maintaining electric neutrality of the crystal. In the niobium-titanium composite oxide of the embodiment, not only is Ti ion reduced from a valence of 4 to a valence of 3, but Nb ion is reduced from a valence of 5 to a valence of 3, also. For this reason, the number of valence reduction per weight of the active material is large. Therefore, the niobium-titanium composite oxide can maintain electric neutrality of the crystal even if a great amount of lithium ions are inserted. Thus, the energy density is higher in comparison to compounds such as titanium oxide containing only a Ti ion whose valence (in a state where lithium ions are not inserted) is tetravalent (valence of 4). Further, the niobium-titanium composite oxide has a lithium insertion potential of about 1.5 V (vs. Li/Li$^+$). Therefore, by virtue of the use of the active material, it is possible to provide a battery capable of repetitive rapid charge-and-discharge in stable manner.

The theoretical capacity of a general niobium-titanium composite oxide, $TiNb_2O_7$ being a representative, is about 387 mAh/g, which is a value two or more times that of an oxide of titanium having a spinel structure. However, the actual capacity of a niobium-titanium composite oxide that has been reported so far is lower than the theoretical capacity, and the actual capacity is confirmed to be about 260 mAh/g.

The inventors of the present application have found that in a niobium-titanium composite oxide, by placing into the crystal structure in advance by substitution, elements having a large ionic radius, such as sodium (Na), potassium (K), Rubidium (Rb), and Cesium (Cs), the above-described conductive path for lithium ions can be enlarged. When the crystal lattice becomes large, those conductive paths are enlarged, and therefore lithium ions become more able to migrate. Due to enlarging of the regions having a two-dimensional channel in which diffusion of lithium ions is rapid and the conductive path in the [001] direction connecting these regions, the capability to have lithium ions be inserted into and extracted from an insertion space is improved. In addition to this, a space for a lithium ion to be inserted and extracted is effectively increased. Thus, it is possible to provide an active material having a high capacity and high rapid charge-and-discharge performances. Moreover, expansion and contraction of the lattice that occur when lithium ions are inserted and extracted can be reduced, and therefore, improvement in life performance can be expected.

In light of this, according to the embodiment, there is provided an active material including a niobium composite oxide having a composition corresponding to a compound in which a portion of niobium (Nb) or titanium (Ti) in the niobium-titanium composite oxide $Nb_2TiO_7$ is substituted by an element M (M(VI), M(V), and M(I)), in such a manner that any one of the following formulas (1) to (3) is satisfied.

$$Ti(IV) \rightarrow 0.75M(V) + 0.25M(I) \quad (1)$$

$$Ti(IV) \rightarrow 0.6M(VI) + 0.4M(I) \quad (2)$$

$$Nb(V) \rightarrow 0.8M(VI) + 0.2M(I) \quad (3)$$

In the above formulas (1) to (3), M(VI) is at least one of Mo and W, M(V) is at least one of Nb, Ta, and V, and M(I) is at least one of Na, K, Rb, and Cs. In a state in which the above compound includes no lithium, for example, a state when the compound had been synthesized, or a state in which a battery including the compound as an active material in the negative electrode is completely discharged, the valence of M(VI) is 6, the valence of M(V) is 5, and the valence of M(I) is 1.

Here, M(VI) may be either one of Mo and W, or a combination of both Mo and W. M(V) may be one of Nb, Ta, and V, or a combination of two or more of Nb, Ta, and V. M(I) may be one of Na, K, Rb, and Cs, or a combination of two or more of Na, K, Rb, and Cs.

The numerical values 0.75 and 0.25 in the formula represent numerical values based on a stoichiometric ratio for maintaining electric charge to neutral. Since a compound of the embodiment includes transition metals, even if the numerical value is deviated within a range of about ±6%, the electric charge can be kept neutral by oxidation-reduction of the transition metals, and therefore, an active material having a desired crystal phase can be obtained. However, since the deviation of the numerical value affects a chargeable capacity, it is preferable that the deviation of numerical value is less than 3%.

The state in which a battery is completely discharged, as described above, indicates a state in which an electrode including the compound is held for 1 hour or more at a potential of +3.0 V with respect to the potential of metallic lithium to thereby extract mobile lithium ions from the compound.

Specifically, in order to obtain the state in which a battery is completely discharged, after the above battery is disassembled under a dry argon gas atmosphere, an electrode including the compound is taken out. Using this electrode, a three-pole half-cell with lithium metal as a counter electrode and a reference electrode is composed. In this case, the electrode works as a positive electrode with respect to lithium metal negative electrode. A current is flown in a charging direction (a direction where lithium is extracted from the electrode) using a charging/discharging device until the cell potential reaches 3.0 V. Once the cell potential has reached 3.0 V, the potential is maintained further at this value for 1 hour or more to perform extraction of lithium ions from the electrode including the compound, whereby the state in which the battery is completely discharged can be achieved.

In the embodiment, the niobium composite oxide is preferably represented by any one of the following general formulas (A) to (E):

  (A)

  (B)

  (C)

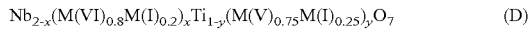  (D)

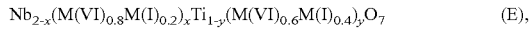  (E), where M(VI) is at least one of Mo and W, M(V) is at least one of Nb, Ta, and V, M(I) is at least one of Na, K, Rb, and Cs, $0<x\leq1$, and $0<y\leq1$.

Specifically, in the above formulas (A) to (E), M(VI) may be either one of Mo and W, or a combination of both Mo and W. M(V) may be one of Nb, Ta, and V, or a combination of two or more of Nb, Ta, and V. M(I) may be one of Na, K, Rb, and Cs, or a combination of two or more of Na, K, Rb, and Cs.

Here, if the subscript value y is 0.1 or more, the Ti site is sufficiently substituted, and improvement in the above-described performances can be expected for the active material of the embodiment. If the subscript value y is more than 0.9, and especially when the value is 1, since Ti within the active material becomes insufficient, a high capacity may not be obtained. Thus, it is preferable that $0<y<1$ and more preferable that $0.1<y\leq0.9$ in the above general formulas (A), (B), (D), and (E). If the subscript value x is 1.0 or more, the Nb site sufficiently substituted, and improvement in the performances of the active material of the embodiment can be expected. Thus, it is more preferable that $0.1<x\leq1.0$ in the above general formulas (C) to (E).

All compounds represented by the above general formulas (A) to (E) have a crystal structure capable of having lithium inserted. Thus, when an active material including these compounds is used in a lithium ion battery, lithium ions may be inserted into the compounds in accompany with the charge and discharge of the battery. In consideration of insertion and extraction of lithium into and from the compounds, the above general formulas (A) to (E) can be represented by the following general formulas (A') to (E'):

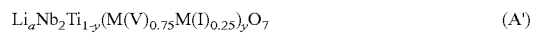  (A')

  (B')

  (C')

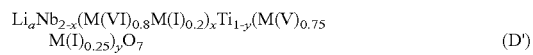  (D')

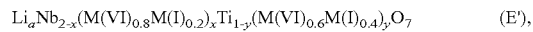  (E'), where M(VI) is at least one of Mo and W, M(V) is at least one of Nb, Ta, and V, M(I) is at least one of Na, K, Rb, and Cs, $0<x\leq1$, $0<y\leq1$, and $0\leq a\leq5$.

Specifically, in the above formulas (A) to (E), M(VI) may be either one of Mo and W, or a combination of both Mo and W. M(V) may be one of Nb, Ta, and V, or a combination of two or more of Nb, Ta, and V. M(I) may be one of Na, K, Rb, and Cs, or a combination of two or more of Na, K, Rb, and Cs.

In the above general formulas (A') to (E'), the subscript $\underline{a}$ may change within a range of $0\leq a\leq5$ by insertion and extraction of lithium into and from the active material in accompany with charge and discharge of the battery. In other words, the subscript $\underline{a}$ indicates an amount of lithium ions included in the compound as an active material.

The lithium insertion sites in the above-described monoclinic crystal structure can stably maintain their structure, even if a lattice constant is changed by insertion of lithium maintained.

Next, in the crystal structure, Nb and Ti, and M(V) and M(VI), which substitute them, may all exist within equivalent crystal sites at a uniform proportion. Here, that the crystal sites are equivalent means that they exist at positions where the symmetry within a crystal is equivalent. In each of the equivalent crystal sites, any of Nb, Ti, M(V), and M(VI) may exist at the same probability. As described, that the various elements exist within an equivalent crystal site at a uniform proportion means that an uneven distribution of elements within the crystal site does not occur. Namely, the various elements are stochastically disposed evenly amongst all the crystal sites of which they occupy. In other words, Nb, Ti, M(V), and M(VI) are randomly arranged within occupancy sites in the crystal structure.

Since the random arrangement is thus obtained, even if a portion of or all of Nb or Ti is substituted based on the above substitution formulas (1) to (3), the structure shown in FIGS. 1 and 2 can be maintained. However, for Nb in the crystal structure, correlation to a charge and discharge capacitance is large, therefore, if more than half of the total amount of Nb is substituted, the capacitance is significantly reduced.

Meanwhile, Na, K, Rb, and Cs, which are M(I), are elements having ion radii larger than those of Nb, Ti, M(V) and M(VI). These M(I) elements may exist at the above-described sites equivalent to Nb and Ti, or at a crystal site equivalent to a lithium insertion site. A composite oxide including M(I) element having a larger ion radius can have a crystal lattice having a larger volume. A nonaqueous electrolyte battery using, as an active material, a composite oxide capable of having a crystal lattice having a large volume can have further improved repetitive charge-and-discharge performances, and as a result, can exhibit more excellent life performance. This is because by increasing the lattice volume in advance, expansion and contraction of the crystal lattice that occur when lithium ions are inserted and extracted is suppressed, and cracking of crystal and peeling from an electrode current collector can be suppressed.

Meanwhile, a similar effect is obtained if Ti in the crystal structure is substituted by a tetravalent element having a large ion radius. Here, the tetravalent element means an element whose valence is 4 in a state in which lithium ion is not electrochemically inserted into the composite oxide and is represented by M(IV). Specifically, a lattice constant can be enhanced by randomly substituting Zr, Hf, Ge, and Sn as M(IV) into Ti sites. However, of these elements, those except for Sn do not have an electrochemical activity at a potential at which lithium can be inserted and extracted, and are not involved in oxidation and reduction that accompany insertion and extraction of lithium. Thus, an amount of substitution using those elements (except for Sn) is preferably half (corresponding to 0.5 mol) or less with respect to the Ti sites. As one example, shown is the case where in a compound represented by $Li_aNb_2Ti_{1-y}(M(V)_{0.75}M(I)_{0.25})_yO_7$, Ti is further substituted by M(IV). Here, when M(IV)=Zr, Hf, and Ge, the composition is represented as $Li_aNb_2M(IV)_zTi_{1-y-z}(M(V)_{0.75}M(I)_{0.25})_yO_7$ ($0<y\leq1$, $0\leq z\leq0.5$, and $0\leq a\leq5$). At this time, only in the case of M(IV)=Sn, the range of the subscript z can be expanded to a range of 0 to 1, and the composition becomes $Li_aNb_2M(IV)_zTi_{1-y-z}(M(V)_{0.75}M(I)_{0.25})_yO_7$ ($0<y\leq1$, $0\leq z\leq1$, and $0\leq a\leq5$).

When the battery active material according to the first embodiment is used as a negative electrode active material, the composite oxide represented by the above general formulas does not theoretically include lithium in a completely discharged state. Actually however, after a battery including, as an active material, the composite oxide represented by the above general formulas is charged and discharged once, lithium may remain in the crystal structure of the composite oxide even in a discharged state. However, the battery active material according to the first embodiment can realize a nonaqueous electrolyte battery capable of exhibiting excellent rapid charge-and-discharge performances and repetitive charge-and-discharge performances even in a state in which lithium exists in the crystal structure.

<Particle Diameter and Specific Surface Area>

An average particle diameter of a composite oxide included in the battery active material according to the first embodiment is not particularly limited and can be changed according to desired battery properties. For example, the average particle diameter of the composite oxide may be 0.1 to 10 μm. If the average particle diameter is more than 0.1 μm, the crystal structure can be stabilized by enhancing the crystallinity. Meanwhile, by having the average particle diameter be less than 10 μm, movement of lithium ions within the crystal can be facilitated. In the composite oxide, there may be formed secondary particles that are formed of primary particles having such an average particle diameter. The average particle diameter of the secondary particles is 1 to 30 μm, for example. When the average particle diameter of the secondary particles is 1 μm or more, an electrode coating liquid can be stabilized. When the average particle diameter of the secondary particles is less than 30 μm, the active material becomes applicable to a design having a reduced electrode film thickness.

Further, the BET specific surface area of the composite oxide included in the battery active material according to the first embodiment is not particularly limited, and is preferably 0.1 m$^2$/g or more and less than 100 m$^2$/g. When the BET specific surface area is 0.1 m$^2$/g or more, the contact area with the electrolytic solution can be secured. Thus, good discharge rate performances can be easily obtained and also, a charge time can be shortened. On the other hand, when the BET specific surface area is less than 100 m$^2$/g, reactivity with the electrolytic solution can be prevented from becoming too high and therefore, the life performance can be improved. When the BET specific surface area is 100 m$^2$/g or less, a coatability of a slurry including the active material used in the production of an electrode, which will be described later, can be improved.

<Method of Examining Composition of Composite Oxide>

The composition of the battery active material can be analyzed using Inductively Coupled Plasma (ICP) emission spectrometry, for example. In this case, the abundance ratios of elements depend on the sensitivity of the analyzing device that is used. Therefore, the numerical values may deviate from the element ratios disclosed in the present application, by a value in accordance to errors of the measuring device. However, even if the measurement results deviate within the error range of the analyzing device, effects of the present application can be sufficiently exhibited.

<Examination of Solid Solution State of Composite Oxide>

A solid solution state of metal M in a composite oxide can be examined by transmission electron microscope (TEM) observation—energy dispersive X-ray spectroscopy (EDX).

<Examination of Crystal Structure of Composite Oxide>

The crystal structure of a composite oxide included in the battery active material can be examined, for example by combining a powder X-ray diffraction (XRD) measurement and analysis according to a Rietveld method.

The powder X-ray diffraction measurement of the active material may be performed, for example, as follows.

First, the active material is ground to prepare a sample with average particle size of approximately 5 μm or less. The average particle size can be obtained by laser diffraction. The obtained sample is filled in a holder part having a depth of 0.2 mm, formed on a glass sample plate. Then, the surface of the filled sample is flattened by pressing with another glass plate. Take precaution to fill an amount of sample that is not too much or too little, so as to prevent cracks, voids, or any rises and dents in the basic plane of the glass holder. Take care to press the glass plate with sufficient pressure. Next, the glass plate filled with the sample is set in a powder X-ray diffractometer. And then, an XRD pattern is obtained using Cu-Kα rays.

In a case that effects of orientation in the sample is high, there is the possibility of deviation of peak position and variation in an intensity ratio, depending on how the sample is filled. Such a sample having significantly high orientation is measured using a capillary. Specifically, the sample is inserted into the capillary, which is then mounted on a rotary sample table and measured. Such a measuring method can reduce the influence of orientation. As the capillary, one made of Lindemann glass is used.

The X-ray diffraction (XRD) pattern obtained herein must be applicable to Rietveld analysis. In order to collect data for Rietveld analysis, the measurement time or X-ray intensity is appropriately adjusted in such a manner that the step width is made ⅓ to ⅕ of the minimum half width of the diffraction peaks and the intensity at the peak position of strongest reflected intensity is 5,000 counts to 10000 counts.

The obtained XRD pattern obtained is analyzed by the Rietveld method. In the Rietveld method, the diffraction pattern is calculated from the crystal structure model which has been previously estimated. The parameters of the crystal structure (lattice constant, atomic coordinate, crystal site occupancy ratio, or the like) can be precisely analyzed by fitting all the calculated values with the measured values. Thereby, the characteristics of the crystal structure of the synthesized oxide can be determined. Furthermore, the site occupancy ratio of constitutional elements in each of the sites can be determined.

A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation $\sigma_j$ must be taken into consideration. The fitting parameter S and standard deviation $\sigma_j$ defined herein are estimated using the formula described in "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.). In this method, for a niobium-titanium composite oxide having space group C2/m symmetry of the embodiment, cases where fitting is performed assuming different states are tested. More specifically, on one hand, a case is tested under the assumption that each element evenly occupies each of the 2a or 4i metal element occupancy sites in the crystal structure. On the other hand, a case is tested where fitting is performed with individual occupancy rates set for each element, assuming that distribution of ions of each element is biased. Among the tested fittings, the one having a smaller convergence value of a fitting parameter S, that is, the one with better fitting can be determined to be closer to the actual occupation state. Thus, it can be determined whether elements are randomly arranged, or not.

<Method of Measuring Specific Surface Area of Composite Oxide>

The measurement of the specific surface area of the composite oxide included in the battery active material according to the first embodiment may be performed by a method where molecules, in which an occupied area in adsorption is known, are adsorbed onto the surface of powder particles at the temperature of liquid nitrogen and determining the specific surface area of the sample from the amount of adsorbed molecules. The most frequently used method is a BET method based on the low temperature/low humidity physical adsorption of an inert gas. The basic theory of the BET method is the most well-known theory of the method of calculating the specific surface area in which the Langmuir theory, which is a monolayer adsorption theory, is extended to multilayer adsorption. The specific surface area determined by the above method is referred to as "BET specific surface area".

<Measurement of Active Material Included in Electrode>

When powder X-ray diffraction measurement, ICP measurement, TEM-EDX measurement, and measurement of a specific surface area with the use of a BET method are performed for an active material as an electrode material included in a battery, these measurements can be performed as follows, for example.

First, in order to grasp the crystal state of the active material, the active material is put in a state in which lithium ions are completely extracted from a composite oxide. For example, when a negative electrode active material is to be measured, a battery including the negative electrode active material is brought into a state in which the electrode is completely discharged. However, as described above, even if the battery is put in a completely discharged state, lithium ions remaining in the negative electrode active material may exist.

Next, the battery is disassembled in a glove box filled with argon, and the electrode is taken out. The thus taken out electrode is washed with a suitable solvent. As a suitable solvent, ethyl methyl carbonate may be used, for example.

In the case of powder X-ray diffraction measurement, the electrode washed as described above is cut out to have an area equivalent to an area of a holder of a powder X-ray diffraction device, so that the cut-out electrode can be used as a measurement sample. Measurement is performed with this sample applied directly onto a glass holder.

Alternatively, in performing the measurement, an electrode layer may be physically dislodged from the current collector. By applying ultrasonic waves in a solvent, the electrode layer can be easily peeled from the current collector. An electrode powder sample may be prepared from the electrode layer thus peeled and subjected to various measurements.

At this time, a peak corresponding to metal of metal foil included, as a current collector, in the electrode is measured in advance using XRD, and a peak position derived from an electrode current collector is taken note of. The peak positions of other components such as a conductive auxiliary agent and a binder are also measured in advance by a similar method, and taken note of. When a peak of a current collector material and a peak of an active material overlap each other, it is preferable that measurement is performed with the layer including the active material (e.g., an active material-including layer described later) is peeled from a current collector. This is done in order to separate overlapping peaks when quantitatively measuring the peak intensity. The peeled active material-including layer is sealed in a capillary and placed on a rotating sample stage, whereby measurement is performed. According to such a method, an XRD pattern of the active material can be obtained with an influence of orientation being reduced. Of course, if these peaks can be taken note of in advance, such an operation may be omitted.

In some cases, due to an influence of lithium ions remaining in the electrode, contamination by an impurity phase such as of lithium carbonate and lithium fluoride may be observed in results of the powder X-ray diffraction measurement. The contamination by the impurity phase can be prevented, for example by using an inert gas atmosphere as the measurement atmosphere or washing the electrode surface. Even if impurity phases exist, analysis can be performed ignoring these phases.

When performing the ICP measurement, the TEM-EDX measurement, and the measurement of a specific surface area with the use of a BET method for the active material included in the electrode that is taken out from the battery and washed, the electrode is cut out to have a suitable size, or the active material is peeled from the current collector to be used as a measurement sample, as in the powder X-ray diffraction measurement.

<Method of Production>

The active material of the embodiment can be produced by the following method.

First, a starting material is mixed. As starting materials for a niobium-titanium composite oxide, oxides or salts including Li, Ti, and Nb are used. The salt used as the starting material is preferably salt such as carbonates and nitrates, which decomposes at a relatively low temperature to produce an oxide.

The starting material is mixed at an element ratio such that a desired composition would be achieved. Then, the obtained mixture is pulverized to obtain a mixture that is uniform as much as possible. Subsequently, the obtained mixture is calcined. The calcining is performed within a temperature range of 500 to 1450° C., divided into two or more steps for a total of 10 to 40 hours. After calcining, the calcined product is immediately taken out from the electric furnace and then cooled to room temperature. Preferably, the calcined product is cooled under a condition such that the temperature of the calcined product lowers from the calcining temperature to 100° C. or less within 1 hour. Thus, an electrode active material including the desired niobium-titanium composite oxide can be obtained.

In the niobium-titanium composite oxide synthesized by the above method, lithium ions may be inserted by charging a battery including the composite oxide as a negative electrode active material. Alternatively, the niobium-titanium composite oxide may be synthesized as a composite oxide including lithium by using, as a starting material, a lithium-including compound such as lithium carbonate.

According to the first embodiment, since included is the niobium composite oxide including M(I) elements and M(V) elements or M(VI) elements at a specific inclusion ratio, there can be provided an active material having high energy density and high rapid charge-and-discharge performances and excellent in life performance.

Second Embodiment

According to a second embodiment, provided is a nonaqueous electrolyte battery including a negative electrode that includes the active material according to the above described first embodiment, a positive electrode, and a nonaqueous electrolyte, a separator, and a container member.

Hereinafter, the negative electrode, the positive electrode, the nonaqueous electrolyte, the separator, and the container member will be described in detail.

1) Negative Electrode

The negative electrode includes a current collector and a negative electrode layer (that is, a negative electrode active material-including layer). The negative electrode layer is formed on one surface or reverse surfaces of the current collector. The negative electrode layer includes an active material, and optionally a conductive agent and a binder.

As a negative electrode active material, the battery active material described in the first embodiment is used. Accordingly, it is possible to provide a battery excellent in productivity and having excellent rapid charge-and-discharge performances and high energy density.

As the negative electrode, the battery active material according to the first embodiment may be singly used as the negative electrode active material; however, another active material may also be used in combination. Other active materials include titanium dioxide ($TiO_2$) having an anatase structure, lithium titanate having a ramsdellite structure (e.g., $Li_2Ti_3O_7$), a lithium titanate having a spinel structure (e.g., $Li_4Ti_5O_{12}$). One kind of the other active materials may be used singly, or two or more kinds of the other active materials may be used in combination.

The conductive agent is added to improve a current collection performance and to suppress the contact resistance between the active material and the current collector. Examples of the conductive agent include carbonaceous substances such as acetylene black, carbon black, and graphite.

The binder is added to fill gaps among the dispersed negative electrode active material and also to bind the active material with the current collector. Examples of the binder include polytetrafluoroethylene (PTFE), polyvinylidene fluoride (PVdF), fluorine rubber, and styrene-butadiene rubber.

The active material, conductive agent and binder in the negative electrode layer are preferably blended in proportions of 68% by mass to 96% by mass, 2% by mass to 30% by mass, and 2% by mass to 30% by mass, respectively. When the amount of conductive agent is 2% by mass or more, the current collection performance of the negative electrode layer can be improved. When the amount of binder is 2% by mass or more, binding between the negative electrode layer and current collector becomes sufficient, and excellent cycling performances can be expected. On the other hand, an amount of each of the conductive agent and binder is preferably 28% by mass or less, in attempting to increase the capacity.

As the current collector, a material which is electrochemically stable at the lithium insertion and extraction potential of the negative electrode active material is used. The current collector is preferably made of copper, nickel, stainless steel or aluminum, or an aluminum alloy including one or more elements selected from Mg, Ti, Zn, Mn, Fe, Cu, and Si. The thickness of the current collector is preferably 5 μm to 20 μm. The current collector having such a thickness can maintain balance between the strength and weight reduction of the negative electrode.

The negative electrode is produced by, for example, suspending a negative electrode active material, a binder, and a conductive agent in an ordinarily used solvent to prepare a slurry, applying the slurry to a current collector, drying the coating to form a negative electrode layer, and then pressing the layer. The negative electrode may also be produced by forming a negative electrode active material, a binder, and a conductive agent into pellets as the negative electrode layer, and disposing the pellets onto a current collector.

2) Positive Electrode

The positive electrode includes a current collector and a positive electrode layer (that is, positive electrode active material-including layer). The positive electrode layer is formed on one surface or reverse surfaces of the current collector. The positive electrode layer includes a positive electrode active material, and optionally a conductive agent and a binder.

As the positive electrode active material, for example, an oxide or a sulfide may be used. Examples of the oxide and sulfide include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium manganese nickel composite oxide having a spinel structure (e.g., $Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate [$Fe_2(SO_4)_3$], vanadium oxide (e.g., $V_2O_5$), and lithium nickel cobalt manganese composite oxide, to which lithium can be inserted. In the above-described formulas, $0<x\le1$, and $0<y\le1$. As the active material, one of these compounds may be used singly, or plural compounds may be used in combination.

More preferred examples of the active material include lithium manganese composite oxide (e.g., $Li_xMn_2O_4$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese nickel composite oxide having a spinel structure (e.g., $Li_xMn_{2-y}Ni\,O_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide, which have a high positive electrode voltage. In the above-described formulas, $0<x\le1$, and $0<y\le1$.

When an ordinary temperature molten salt is used as the nonaqueous electrolyte of the battery, preferred examples of the active material include lithium iron phosphate, $Li_xVPO_4F$ ($0\le x\le1$), lithium manganese composite oxide, lithium nickel composite oxide, and lithium nickel cobalt composite oxide. Since these compounds have low reactivity with ordinary temperature molten salts, cycle life can be improved.

The primary particle size of the positive electrode active material is preferably 100 nm to 1 µm. The positive electrode active material having a primary particle size of 100 nm or more is easy to handle during industrial production. In the positive electrode active material having a primary particle size of 1 µm or less, diffusion of lithium ions within solid can proceed smoothly.

The specific surface area of the positive electrode active material is preferably 0.1 $m^2/g$ to 10 $m^2/g$. The positive electrode active material having a specific surface area of 0.1 $m^2/g$ or more can secure sufficient sites for inserting and extracting lithium ions. The positive electrode active material having a specific surface area of 10 $m^2/g$ or less is easy to handle during industrial production, and can secure a good charge and discharge cycle performance.

The binder is added to bind the active material with the current collector. Examples of the binder include polytetrafluoroethylene (PTFE), polyvinylidene fluoride (PVdF), and fluorine rubber.

The conductive agent is added as necessary, in order to improve the current collection performance, and at the same time, suppress the contact resistance between the active material and current collector. Examples of the conductive agent include carbonaceous substances such as acetylene black, carbon black, and graphite.

In the positive electrode layer, the active material and binder are preferably included in proportions of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of the insulator in the electrode can be reduced, and thereby the internal resistance can be decreased.

When a conductive agent is added, the active material, binder, and conductive agent are preferably included in proportions of 77% by mass to 95% by mass, 2% by mass to 20% by mass, and 3% by mass to 15% by mass, respectively. When the amount of the conductive agent is 3% by mass or more, the above-described effects can be expressed. By setting the amount of the conductive agent to 15% by mass or less, the decomposition of a nonaqueous electrolyte on the surface of the positive electrode conductive agent during high-temperature storage can be reduced.

The current collector is preferably an aluminum foil, or an aluminum alloy foil including one or more elements selected from Mg, Ti, Zn, Ni, Cr, Mn, Fe, Cu, and Si.

The thickness of the aluminum foil or aluminum alloy foil is preferably 5 µm to 20 µm, and more preferably 15 µm or less. The purity of the aluminum foil is preferably 99% by mass or more. The amount of the transition metal such as iron, copper, nickel, or chromium included in the aluminum foil or aluminum alloy foil is preferably 1% by mass or less.

The positive electrode is produced by, for example, suspending an active material, a binder, and a conductive agent, which is added as necessary, in an appropriate solvent to prepare a slurry, applying the slurry to a positive electrode current collector, drying the coating to form a positive electrode layer, and then pressing the layer. The positive electrode may also be produced by forming an active material, a binder, and a conductive agent, which is added as necessary, into pellets as the positive electrode layer, and disposing the pellets onto a current collector.

3) Nonaqueous Electrolyte

The nonaqueous electrolyte may be, for example, a liquid nonaqueous electrolyte which is prepared by dissolving an electrolyte in an organic solvent, or gel like nonaqueous electrolyte which is a composite of a liquid electrolyte and a polymer material.

The liquid nonaqueous electrolyte is preferably prepared by dissolving an electrolyte in an organic solvent at a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide ($LiN(CF_3SO_2)_2$), and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate (VC); a linear carbonate such as diethyl carbonate (DEC), dimethyl carbonate (DMC), or methyl ethyl carbonate (MEC); a cyclic ether such as tetrahydrofuran (THF), 2-methyl tetrahydrofuran (2-MeTHF), or dioxolane (DOX); a linear ether such as dimethoxy ethane (DME) or diethoxy ethane (DEE); γ-butyrolactone (GBL), acetonitrile (AN), and sulfolane (SL). These organic solvents may be used singularly or as a mixed solvent.

Examples of the polymeric material include polyvinylidene fluoride (PVdF), polyacrylonitrile (PAN), and polyethylene oxide (PEO).

Alternatively, the nonaqueous electrolyte may be, for example, an ordinary temperature molten salt (ionic melt) including lithium ions, a polymer solid electrolyte, or an inorganic solid electrolyte.

The ordinary temperature molten salt (ionic melt) means compounds among organic salts made of combinations of organic cations and anions, which are able to exist in a liquid state at ordinary temperature (15 to 25° C.). The ordinary temperature molten salt includes an ordinary temperature molten salt which exists alone as a liquid, an ordinary temperature molten salt which becomes a liquid upon mixing with an electrolyte, and an ordinary temperature molten salt which becomes a liquid when dissolved in an organic solvent. In general, the melting point of the ordinary temperature molten salt used in nonaqueous electrolyte batteries is 25° C. or below. The organic cations generally have a quaternary ammonium framework.

The polymer solid electrolyte is prepared by dissolving the electrolyte in a polymeric material, and solidifying it.

The inorganic solid electrolyte is a solid substance having lithium ion conductivity.

4) Separator

The separator may be made of, for example, a porous film or synthetic resin nonwoven fabric including polyethylene, polypropylene, cellulose, or polyvinylidene fluoride (PVdF). Among these, a porous film formed from polyethylene or polypropylene melts at a fixed temperature and thus able to shut off a current, therefore the porous film can improve safety.

5) Container Member

As the container member, a laminate film having a thickness of 0.5 mm or less, or a metal case having a wall thickness of 1 mm or less may be used. The thickness of the laminate film is more preferably 0.2 mm or less. The wall thickness of the metal case is more preferably 0.5 mm or less, and still more preferably 0.2 mm or less.

The shape of the container member may be flat (thin), square, cylinder, coin, or button-shaped. The container member depends on the size of the battery, and may be that for a compact battery mounted on mobile electronic devices, or a large battery mounted on two- to four-wheel automobiles.

For the laminate film, used is a multilayer film where a metal layer is sandwiched between resin layers. The metal layer is preferably an aluminum foil or an aluminum alloy foil, so as to reduce weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy. As the aluminum alloy, an alloy including an element such as magnesium, zinc, or silicon is preferable. If a transition metal such as iron, copper, nickel, or chromium is included in the alloy, the included amount thereof is preferably set to 100 ppm or less.

6) Nonaqueous Electrolyte Secondary Battery

Next, an example of a battery according to the second embodiment will be specifically described with reference to the drawings.

FIG. 3 is a cross-sectional view of a flat-form nonaqueous electrolyte secondary battery. FIG. 4 is an enlarged cross-sectional view showing a portion A in FIG. 3. Each drawing is a typical view for explaining the embodiments and for promoting an understanding of the embodiments. Though there are parts different from an actual device in shape, dimension and ratio, these structural designs may be properly changed taking the following explanations and known technologies into consideration.

A flat-form wound electrode group 1 in flat form is housed in a bag-shaped container member 2. The bag shaped container member 2 is made of a laminate film where a metal layer is sandwiched between two resin layers. The flat-form wound electrode group 1 is formed by, spirally winding a stack where stacked, in order from the outside, are a negative electrode 3, a separator 4, a positive electrode 5, and a separator 4, as shown in FIG. 4, and then press-forming the wound laminate.

The negative electrode 3 includes a negative electrode current collector 3a and a negative electrode layer 3b. The above describe negative electrode active material is included in the negative electrode layer 3b. The negative electrode 3 on the outermost side has a configuration in which a negative electrode layer 3b is formed only on one surface, which is the internal surface of a negative electrode current collector 3a, as shown in FIG. 4. In the other negative electrodes 3, the negative electrode layers 3b are formed on both of reverse surfaces of the negative electrode current collector 3a.

In the positive electrode 5, positive electrode layers 5b are formed on both of reverse surfaces of the positive electrode current collector 5a.

As shown in FIG. 3, in the vicinity of the outer peripheral edge of the wound electrode group 1, a negative electrode terminal 6 is connected to the negative electrode current collector 3a in the outermost negative electrode 3, and a positive electrode terminal 7 is connected to the positive electrode current collector 5a in the positive electrode 5 on the inner side. The negative electrode terminal 6 and the positive electrode terminal 7 are extended out from the opening of the bag shaped container member 2. The liquid like nonaqueous electrolyte is, for example, inserted from an opening in the bag-shaped container member 2. By heat-sealing the opening in the bag-shaped container member 2, sandwiching the negative electrode terminal 6 and positive electrode terminal 7 therebetween, the wound electrode group 1 and liquid-form nonaqueous electrolyte are completely sealed in.

The negative electrode terminal 6 may be made of a material which is electrochemically stable at the Li insertion and extraction potential, and having electrical conductivity. Specific examples include copper, nickel, stainless steel, or aluminum. The negative electrode terminal 6 is preferably made of the same material as the negative electrode current collector 3a in order to reduce the contact resistance with the negative electrode current collector 3a.

The positive electrode terminal 7 may be formed of, for example, a material which has electrical stability in the potential range of 3 V to 5 V (vs. Li/Li$^+$) relative to an oxidation-and-reduction potential of lithium, and electrical conductivity. Specifically, the positive electrode terminal is formed of aluminum or an aluminum alloy including Mg, Ti, Zn, Mn, Fe, Cu, Si or the like. The positive electrode terminal 7 is preferably formed of the same material as the positive electrode current collector 5a in order to reduce contact resistance with the positive electrode current collector 5a.

Figure 5:
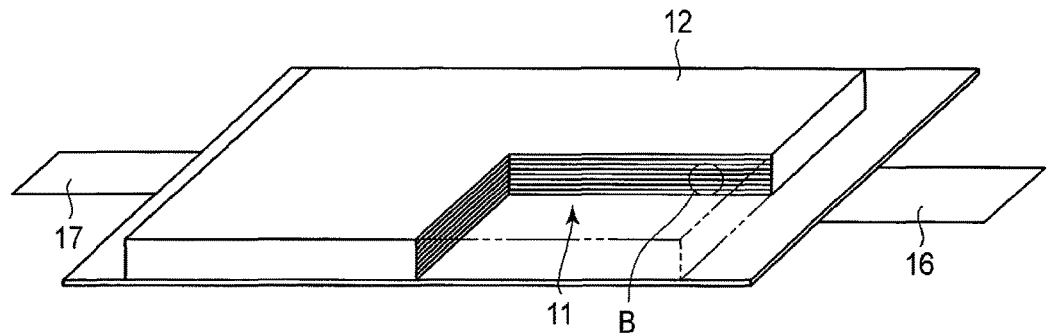
FIG. 5 is a partially cut-out perspective view schematically showing a flat type nonaqueous electrolyte battery of another example according to the second embodiment.
Figure 6:
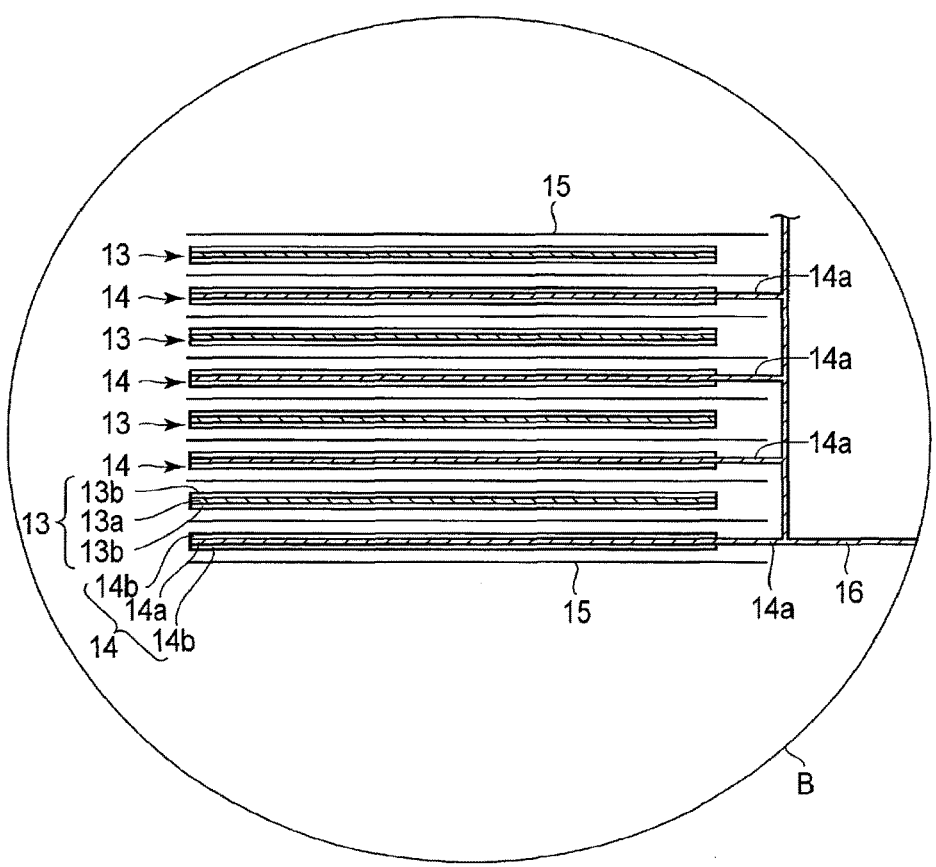
FIG. 6 is an enlarged cross-sectional view of portion B of FIG. 5.

The nonaqueous electrolyte battery according to the second embodiment is not limited to the configuration shown in FIGS. 2 and 3 described above. For example, the battery may be configured as shown in FIGS. 5 and 6. FIG. 5 is a partially cut-out perspective view schematically showing another flat-form nonaqueous electrolyte secondary battery according to the second embodiment. FIG. 6 is an enlarged cross-sectional view showing a portion B in FIG. 5.

A stacked electrode group 11 is housed in the container member 12. The container member 12 is made of a laminate film where a metal layer is sandwiched between two resin films. As shown in FIG. 6, the stacked electrode group 11 has a structure in which positive electrodes 13 and negative electrodes 14 are alternately stacked with a separator 15 sandwiched therebetween. The electrode group 11 includes plural positive electrodes 13. Each of the plural positive electrodes 13 includes a positive electrode current collector 13a, and a positive electrode layer 13b supported on both of reverse surfaces of the positive electrode current collector 13a. The electrode group 11 includes plural negative electrodes 14. Each of the plural negative electrodes 14 includes a negative electrode current collector 14a, and a negative electrode layer 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of the positive electrode current collector 13a of the positive electrode 13 protrudes from the positive electrode 13 at the side opposed to the protruded end of the negative electrode current collector 14a. The positive electrode current collector 13a protruding from the positive electrode 13 is electrically connected to a strip-shaped positive electrode terminal 17. The tip of the strip-shaped positive electrode terminal 17 is positioned on the opposite side from the negative electrode terminal 16, and extended out from a side of the container member 12.

According to the above described second embodiment, by including the active material according to the first embodiment, there can be provided a nonaqueous electrolyte battery exhibiting having high energy density and high rapid charge-and-discharge performance, and excellent in life performance.

Third Embodiment

Next, an example of a battery pack according to the third embodiment will be described with reference to the drawings. The battery pack includes one or plural of the nonaqueous electrolyte battery (unit cell) according to the second embodiment described above. When plural unit cells are included, each of the unit cells are arranged so as to be electrically connected in series or in parallel. The plural unit cells may also be connected in a combination of in a series and in parallel. The plural nonaqueous electrolyte batteries can be electrically connected to structure a battery module. The battery pack according to the third embodiment may include plural battery modules.

The battery pack according to the third embodiment may further include a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the nonaqueous electrolyte battery, and to input current to the nonaqueous electrolyte battery. In other words, when the battery pack is used as a power source, the current is externally provided via the external power distribution terminal. When the battery pack is charged, the charging current (including regenerative energy caused by power of vehicles such as automobiles) is provided to the battery pack via the external power distribution terminal.

Figure 7:
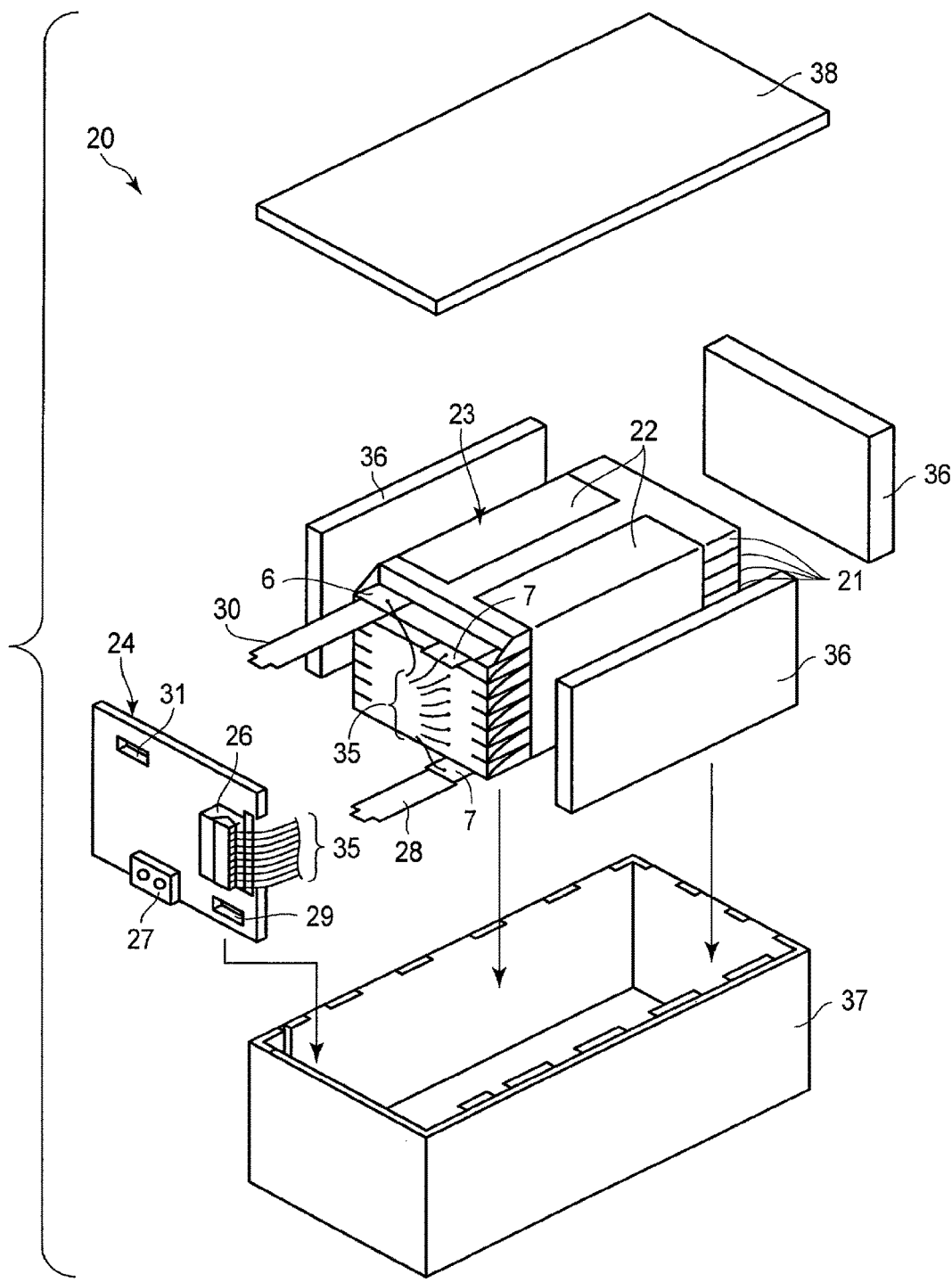
FIG. 7 is an exploded perspective view of a battery pack according to a third embodiment.

One example of a battery pack 20 is shown in FIGS. 7 and 8. This battery pack 20 includes plural flat-form batteries 21 having the configuration shown in FIG. 3. FIG. 7 is an exploded perspective view of an example of the battery pack 20. FIG. 8 is a block diagram showing an electric circuit of the battery pack 20 of FIG. 7.

Plural unit cells 21 are stacked so that the negative electrode terminals 6 and the positive electrode terminals 7 extended outside are arranged in the same direction, and fastened with an adhesive tape 22 to configure a battery module 23. The unit cells 21 are electrically connected in series as shown in FIG. 8.

A printed wiring board 24 is arranged to face opposite to the side plane where the negative electrode terminal 6 and the positive electrode terminal 7 of the unit cell 21 extend out from. A thermistor 25, a protective circuit 26, and an energizing terminal 27 to an external device, which serves as an external power distribution terminal, are mounted on the printed wiring board 24 as shown in FIG. 8. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. A negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wires 32 and 33 formed on the printed wiring board 24.

The thermistor 25 detects the temperature of the unit cells 21, and the detection signal is sent to the protective circuit 26. The protective circuit 26 can shut down a plus-side wire 34a and a minus-side wire 34b between the protective circuit 26 and the energizing terminal 27 to an external device, serving as an external power distribution terminal, under a predetermined condition. The predetermined condition indicates, for example, the case where the temperature detected by the thermistor 25 becomes a predetermined temperature or more. Another example of the predetermined condition is when the over-charge, over-discharge, or over-current of the unit cells 21 is detected. The detection of the over-charge and the like is performed on each of the unit cells 21 or the whole of the unit cells 21. When each of the unit cells 21 is detected, the cell voltage may be detected, or positive electrode or negative electrode potential may be detected. In the latter case, a lithium electrode to be used as a reference electrode is inserted into each of the unit cells 21. In the case of FIGS. 7 and 8, wires 35 for voltage detection are connected to each of the unit cells 21. Detection signals are sent to the protective circuit 26 through the wires 35.

Protective sheets 36 made of rubber or resin are arranged on three side planes of the battery module 23 except the side plane from which the positive electrode terminal 7 and the negative electrode terminal 6 protrude out from.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the internal surface on the opposite side in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 7 and 8, an embodiment has been shown where unit cells 21 are connected in series; however, the connection may be made in parallel in order to increase battery capacity. Alternatively, connection in series may be combined with connection in parallel. Assembled battery packs may be connected further in series or in parallel.

Furthermore, although the battery pack shown in FIGS. 7 and 8 include plural unit cells 21, the battery pack according to the third embodiment may include only one unit cell 21.

The aspect of the battery pack may be appropriately changed depending on its application. The battery pack according to the embodiment can be suitably used in applications in which cycle performance is demanded to be excellent when large current is taken out. Specifically the battery pack is used as a power source of a digital camera, or for example, a battery for mounting on a vehicle such as a two- to four-wheeled hybrid electric automobiles, a two- to four-wheeled electric automobiles or a power-assisted bicycle. In particular, the battery pack is suitably used for a battery mounted on a vehicle.

In a vehicle to which the battery pack according to the third embodiment has been mounted, the battery pack is configured, for example, to recover regenerative energy caused by power of the vehicle. Examples of the vehicle include two to four-wheeled hybrid electric automobiles, two to four-wheeled electric automobiles, electric assist bicycles, and electric trains.

Figure 9:
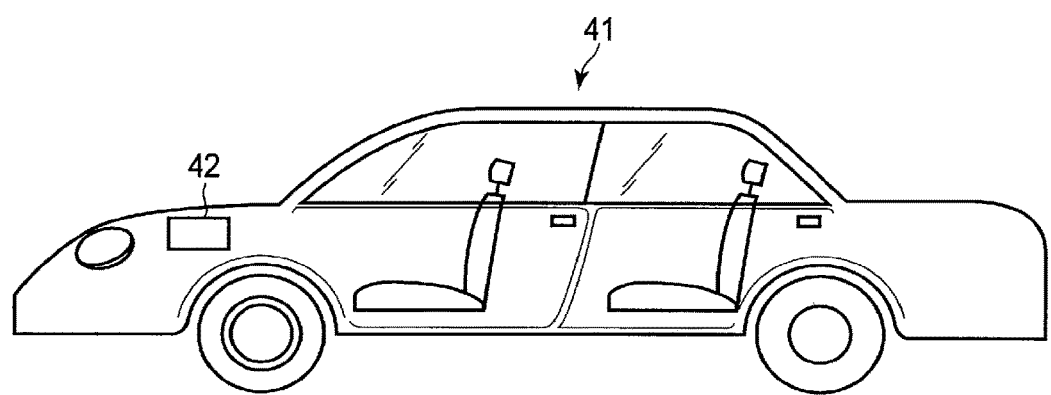
FIG. 9 is a schematic diagram of an example of a vehicle including the battery pack according to the third embodiment.

FIG. 9 shows an example of an automobile that includes a battery pack according to the third embodiment.

The automobile 41 shown in FIG. 9 includes a battery pack 42, which is an example of the battery pack according to the third embodiment, mounted in its engine room. The mounting position is not limited to engine rooms. For example, the battery pack may also be mounted in rear parts of automobiles or under seats.

According to the above described third embodiment, by including the nonaqueous electrolyte battery according to the second embodiment, there can be provided a battery pack having high energy density and high rapid charge-and-discharge performance, and excellent in life performance.

EXAMPLES

Hereinafter, the above embodiments will be described in more detail based on examples.

Synthesis

Examples 1 to 5

A total of five kinds of active materials were synthesized. Of these, three kinds of compounds were those in which M(I)=Na and M(V)=Nb, and y=0.1 (Example 1), 0.5 (Example 2), or 1.0 (Example 3) for a compound represented by $Nb_2Ti_{1-y}(M(V)_{0.75}M(I)_{0.25})_yO_7$, and two kinds of compounds were those in which M(I)=Na, y=0.1, and M(V)=Ta (Example 4) or V (Example 5) for a compound represented by $Nb_2Ti_{1-y}(M(V)_{0.75}M(I)_{0.25})_yO_7$. First, as starting materials, powders of commercially available oxide and carbonate reagents shown in Table 1 were weighed at the indicated raw material mixing ratio and put in a mortar. As a specific example, in Example 1, $TiO_2$ as a Ti source, $Nb_2O_5$ as an Nb source, and $Na_2CO_3$ as an M(I) source were put in a mortar such that the mixing ratio was 1.0:1.153:0.0139. In Example 1, $Nb_2O_5$ is the Nb source in a finally obtained product and at the same time an M(V) source. In each of Examples 1 to 5, ethanol was added to the mortar into which the raw material powders were put, and then wet mixing was performed.

TABLE 1

| | Composition | | Ti source (mixing ratio) | Nb source (mixing ratio) | M(I) source (mixing ratio) | M(V) source (mixing ratio) | M(VI) source (mixing ratio) | M(IV) sorce (mixing ratio) |
|---|---|---|---|---|---|---|---|---|
| Example 1 | $Nb_{2.0}Ti_{0.9}(Nb_{0.75}Na_{0.25})_{0.1}O_7$ | (y = 0.1) | $TiO_2$ (1.0) | $Nb_2O_5$ (1.153) | $Na_2CO_3$ (0.0139) | Summed up in Nb source | — | — |
| Example 2 | $Nb_{2.0}Ti_{0.5}(Nb_{0.75}Na_{0.25})_{0.5}O_7$ | (y = 0.5) | $TiO_2$ (1.0) | $Nb_2O_5$ (2.375) | $Na_2CO_3$ (0.125) | Summed up in Nb source | — | — |
| Example 3 | $Nb_{2.75}Na_{0.25}O_7$ | (y = 1.0) | — | $Nb_2O_5$ (1.0) | $Na_2CO_3$ (0.0455) | Summed up in Nb source | — | — |
| Example 4 | $Nb_{2.0}Ti_{0.9}(Ta_{0.75}Na_{0.25})_{0.1}O_7$ | (y = 0.1) | $TiO_2$ (1.0) | $Nb_2O_5$ (1.111) | $Na_2CO_3$ (0.139) | $Ta_2O_5$ (0.0417) | — | — |
| Example 5 | $Nb_{2.0}Ti_{0.9}(V_{0.75}Na_{0.25})_{0.1}O_7$ | (y = 0.1) | $TiO_2$ (1.0) | $Nb_2O_5$ (1.111) | $Na_2CO_3$ (0.139) | $V_2O_5$ (0.0417) | — | — |
| Example 6 | $Nb_{2.0}Ti_{0.9}(Mo_{0.6}Na_{0.4})_{0.1}O_7$ | (y = 0.1) | $TiO_2$ (1.0) | $Nb_2O_5$ (1.111) | $Na_2CO_3$ (0.0222) | — | $MoO_3$ (0.0667) | — |
| Example 7 | $Nb_{2.0}Ti_{0.9}(W_{0.6}Na_{0.4})_{0.1}O_7$ | (y = 0.1) | $TiO_2$ (1.0) | $Nb_2O_5$ (1.111) | $Na_2CO_3$ (0.0222) | — | $WO_3$ (0.0667) | — |
| Example 8 | $Nb_{1.9}(Mo_{0.8}Na_{0.2})_{0.1}TiO_7$ | (x = 0.1) | $TiO_2$ (1.0) | $Nb_2O_5$ (0.95) | $Na_2CO_3$ (0.0100) | — | $MoO_3$ (0.0800) | — |
| Example 9 | $Nb_{1.5}(Mo_{0.8}Na_{0.2})_{0.5}TiO_7$ | (x = 0.5) | $TiO_2$ (1.0) | $Nb_2O_5$ (0.75) | $Na_2CO_3$ (0.0500) | — | $MoO_3$ (0.40) | — |
| Example 10 | $Nb_{1.0}(Mo_{0.8}Na_{0.2})_{1.0}TiO_7$ | (x = 1.0) | $TiO_2$ (1.0) | $Nb_2O_5$ (0.50) | $Na_2CO_3$ (0.10) | — | $MoO_3$ 0.80 | — |
| Example 11 | $Nb_{1.9}(Mo_{0.8}Na_{0.2})_{0.1}Ti_{0.9}(Ta_{0.75}Na_{0.25})_{0.1}O_7$ | (x = 0.1, y = 0.1) | $TiO_2$ (1.0) | $Nb_2O_5$ (1.056) | $Na_2CO_3$ (0.025) | $Ta_2O_5$ (0.0417) | $MoO_3$ (0.0889) | — |

Then, the thus obtained mixture was set in an electric furnace (box-type muffle furnace) and subjected to heating treatment, as described in Table 2. Specifically, preliminary calcining was first performed at a temperature of 850° C. for 6 hours. Subsequently, a preliminarily calcined powder was taken out from the furnace, pulverized again, and then, mixed further.

To the thus obtained mixture, first calcining was successively performed at a temperature of 1100° C. for 6 hours. After calcining, the calcined powder was taken out from the furnace and then mixed again.

Successively, the calcined powder, which had been mixed again, was placed into the furnace and subjected to second calcining at a temperature of 1100° C. for 6 hours. After calcining, the calcined powder was taken out from the furnace and then mixed again.

In further succession, the calcined powder, which had been mixed again, was placed into the furnace and subjected to third calcining at a temperature of 1100° C. for 12 hours. At this time, the powder, for which calcining at a temperature of 1100° C. had finished, was immediately taken out from the electric furnace and allowed to cool at room temperature in the air.

For each of Examples 1 to 5, a product in powder form that had been obtained after the third calcining, that is, the product in powder form obtained as a result of calcining at a temperature of 1100° C. for a total 24 hours was used as active material in each of Examples 1 to 5.

Examples 6 and 7

In Examples 6 and 7, two kinds of active materials where $M(I)=Na$, $y=0.1$, and $M(VI)=Mo$ (Example 6) or W (Example 7) for a compound represented by $Nb_2Ti_{1-y}(M(VI)_{0.6}M(I)_{0.4})_yO_7$, were synthesized by a procedure similar to that described in Examples 1 to 5 under synthesis conditions described in Tables 1 and 2. Thereby, active materials of Examples 6 and 7 were obtained.

Examples 8 to 10

In Examples 8 to 10, three kinds of active materials where $M(I)=Na$, $M(VI)=Mo$, $x=0.1$ (Example 8), 0.5 (Example 9), or 1.0 (Example 10) for a compound represented by $Nb_{2-x}(M(VI)_{0.8}M(I)_{0.2})_xTiO_7$, were synthesized by a procedure similar to that described in Examples 1 to 5 under synthesis conditions described in Tables 1 and 2, whereby active materials of Examples 8 to 10 were obtained.

Example 11

In Example 11, an active material having a composition where $M(I)=Na$, $M(V)=Ta$, $M(VI)=Mo$, $x=0.1$, and $y=0.1$ for a compound represented by $Nb_{2-x}(M(VI)_{0.8}M(I)_{0.2})_xTi_{1-y}(M(V)_{0.75}M(I)_{0.25})_yO_7$, was synthesized by a procedure similar to that described in Examples 1 to 5 under synthesis conditions described in Tables 1 and 2. Thereby, an active material of Example 11 was obtained.

TABLE 2

| | Whether preliminary calcining has been performed | Conditions of preliminary calcining (temperature/time) | Calcining Temperature | Calcining time $1^{st}/2^{nd}/3^{rd}$ (h) | Cooling condition or heat treatment condition |
|---|---|---|---|---|---|
| Example 1 | performed | 850° C./6 hours | 1100° C. | 6/6/12 | cooling outside of furnace |
| Example 2 | performed | 850° C./6 hours | 1100° C. | 6/6/12 | cooling outside of furnace |
| Example 3 | performed | 850° C./6 hours | 1100° C. | 6/6/12 | cooling outside of furnace |
| Example 4 | performed | 850° C./6 hours | 1100° C. | 6/6/12 | cooling outside of furnace |
| Example 5 | performed | 850° C./6 hours | 1100° C. | 6/6/12 | cooling outside of furnace |
| Example 6 | performed | 850° C./6 hours | 1100° C. | 6/6/12 | cooling outside of furnace |
| Example 7 | performed | 850° C./6 hours | 1100° C. | 6/6/12 | cooling outside of furnace |
| Example 8 | performed | 850° C./6 hours | 1100° C. | 6/6/12 | cooling outside of furnace |
| Example 9 | performed | 850° C./6 hours | 1100° C. | 6/6/12 | cooling outside of furnace |
| Example 10 | performed | 850° C./6 hours | 1100° C. | 6/6/12 | cooling outside of furnace |
| Example 11 | performed | 850° C./6 hours | 1100° C. | 6/6/12 | cooling outside of furnace |

TABLE 3

| | Composition | Ti source (mixing ratio) | Nb source (mixing ratio) | M(I) source (mixing ratio) | M(V) source (mixing ratio) | M(VI) source (mixing ratio) | M(IV) source (mixing ratio) |
|---|---|---|---|---|---|---|---|
| Example 12 | $Nb_{1.9}(Mo_{0.8}Na_{0.2})_{0.1}Ti_{0.9}(Mo_{0.6}Na_{0.4})_{0.1}O_7$ (x = 0.1, y = 0.1) | $TiO_2$ (1.0) | $Nb_2O_5$ (1.056) | $Na_2CO_3$ (0.0333) | — | $MoO_3$ (0.1444) | — |
| Example 13 | $Nb_{2.0}Ti_{0.8}Zr_{0.1}(Nb_{0.75}Na_{0.25})_{0.1}O_7$ (y = 0.1, z = 0.1) | $TiO_2$ (1.0) | $Nb_2O_5$ (1.297) | $Na_2CO_3$ (0.0156) | Summed up in Nb source | — | $SnO_2$ (0.125) |
| Example 14 | $Nb_{2.0}Ti_{0.8}Hf_{0.1}(Nb_{0.75}Na_{0.25})_{0.1}O_7$ (y = 0.1, z = 0.1) | $TiO_2$ (1.0) | $Nb_2O_5$ (1.297) | $Na_2CO_3$ (0.0156) | Summed up in Nb source | — | $SnO_2$ (0.125) |
| Example 15 | $Nb_{2.0}Ti_{0.8}Ge_{0.1}(Nb_{0.75}Na_{0.25})_{0.1}O_7$ (y = 0.1, z = 0.1) | $TiO_2$ (1.0) | $Nb_2O_5$ (1.297) | $Na_2CO_3$ (0.0156) | Summed up in Nb source | — | $SnO_2$ (0.125) |
| Example 16 | $Nb_{2.0}Ti_{0.8}Sn_{0.1}(Nb_{0.75}Na_{0.25})_{0.1}O_7$ (y = 0.1, z = 0.1) | $TiO_2$ (1.0) | $Nb_2O_5$ (2.594) | $Na_2CO_3$ (0.313) | Summed up in Nb source | — | $SnO_2$ (0.1250) |
| Example 17 | $Nb_{2.0}Sn_{0.9}(Nb_{0.75}Na_{0.25})_{0.1}O_7$ (y = 0.1, z = 0.9) | $TiO_2$ (1.0) | $Nb_2O_5$ (2.594) | $Na_2CO_3$ (0.313) | Summed up in Nb source | — | $SnO_2$ (0.1250) |
| Example 18 | $Nb_{2.0}Ti_{0.9}(Nb_{0.75}K_{0.25})_{0.1}O_7$ (y = 0.1) | $TiO_2$ (1.0) | $Nb_2O_5$ (1.153) | $K_2CO_3$ (0.0139) | Summed up in Nb source | — | — |
| Example 19 | $Nb_{2.0}Ti_{0.9}(Nb_{0.75}Rb_{0.25})_{0.1}O_7$ (y = 0.1) | $TiO_2$ (1.0) | $Nb_2O_5$ (1.153) | $Rb_2CO_3$ (0.0139) | Summed up in Nb source | — | — |
| Example 20 | $Nb_{2.0}Ti_{0.9}(Nb_{0.75}Cs_{0.25})_{0.1}O_7$ (y = 0.1) | $TiO_2$ (1.0) | $Nb_2O_5$ (1.153) | $Cs_2CO_3$ (0.0139) | Summed up in Nb source | — | — |
| Example 21 | $Nb_{2.0}Ti_{0.9}(Nb_{0.75}Na_{0.25})_{0.1}O_7$ (y = 0.1) | $TiO_2$ (1.0) | $Nb_2O_5$ (1.153) | $Na_2CO_3$ (0.10) | Summed up in Nb source | — | — |
| Example 22 | $Nb_{2.0}Ti_{0.9}(Nb_{0.75}Na_{0.25})_{0.1}O_7$ (y = 0.1) | $TiO_2$ (1.0) | $Nb_2O_5$ (1.153) | $Na_2CO_3$ (0.0139) | Summed up in Nb source | — | — |

TABLE 4

| | Whether preliminary calcining has been performed | Conditions of preliminary calcining (temperature/time) | Calcining Temperature | Calcining time $1^{st}/2^{nd}/3^{rd}$ (h) | Cooling condition or heat treatment condition |
|---|---|---|---|---|---|
| Example 12 | performed | 850° C./6 hours | 1100° C. | 6/6/12 | cooling outside of furnace |
| Example 13 | performed | 850° C./6 hours | 1100° C. | 6/6/12 | cooling outside of furnace |
| Example 14 | performed | 850° C./6 hours | 1100° C. | 6/6/12 | cooling outside of furnace |
| Example 15 | performed | 850° C./6 hours | 1100° C. | 6/6/12 | cooling outside of furnace |
| Example 16 | performed | 850° C./6 hours | 1100° C. | 6/6/12 | cooling outside of furnace |
| Example 17 | performed | 850° C./6 hours | 1100° C. | 6/6/12 | cooling outside of furnace |
| Example 18 | performed | 850° C./6 hours | 1100° C. | 6/6/12 | cooling outside of furnace |
| Example 19 | performed | 850° C./6 hours | 1100° C. | 6/6/12 | cooling outside of furnace |
| Example 20 | performed | 850° C./6 hours | 1100° C. | 6/6/12 | cooling outside of furnace |
| Example 21 | performed | 850° C./6 hours | 1100° C. | 12/6/6 | cooling outside of furnace |
| Example 22 | performed | 850° C./6 hours | 1200° C. | 6/12/— | cooling outside of furnace |

Example 12

In Example 12, an active material having a composition where M(I)=Na, M(VI)=Mo, x=0.1, and y=0.1 for a compound represented by $Nb_{2-x}(M(VI)_{0.8}M(I)_{0.2})_xTi_{1-y}(M(VI)_{0.6}M(I)_{0.4})_yO_7$, was synthesized by a procedure similar to that described in Examples 1 to 5 under synthesis conditions described in Tables 3 and 4, whereby an active material of Example 12 was obtained.

Examples 13 to 17

In Examples 13 to 17 four kinds of compounds where M(I)=Na, M(V)=Nb, y=0.1, z=0.1, M(IV)=Zr (Example 13), Hf (Example 14), Ge (Example 15), or Sn (Example 16) for a compound represented by $Nb_2M(IV)_zTi_{1-y-z}(M(V)_{0.75}M(I)_{0.25})_yO_7$, and a compound in which M(I)=Na, M(V)=Nb, M(IV)=Sn, y=0.1, and z=0.9 (Example 17) for a compound represented by $Nb_2M(IV)_zTi_{1-y-z}(M(V)_{0.75}M(I)_{0.25})_yO_7$, were synthesized by a procedure similar to that described in Examples 1 to 5 under synthesis conditions described in Tables 3 and 4. Thereby, active materials of Examples 13 to 17 were obtained.

Examples 18 to 20

In Examples 18 to 20, three kinds of active materials in which M(V)=Nb, y=0.1, and M(I)=K (Example 18), Rb (Example 19), or Cs (Example 20) for a compound represented by $Nb_2Ti_{1-y}(M(V)_{0.75}M(I)_{0.25})_yO_7$ were synthesized by a procedure similar to that described in Examples 1 to 5 under synthesis conditions described in Tables 3 and 4. Thereby, active materials of Examples 18 to 20 were obtained.

Examples 21 to 22

In Examples 21 to 22, in order to synthesize a compound in which M(I)=Na, M(V)=Nb, and y=0.1 for a compound represented by $Nb_2Ti_{1-y}(M(V)_{0.75}M(I)_{0.25})_yO_7$, which is the same composition as that in Example 1, a raw material was mixed as in Example 1. Then, the thus obtained mixture was placed into an electric furnace and subjected to heating treatment, as described in Table 4. Specifically, preliminary calcining was first performed at a temperature of 850° C. for 6 hours. Subsequently, a preliminarily calcined powder was taken out from the furnace, pulverized again, and then, further mixed.

In Example 21, to the thus obtained mixture, first calcining was successively performed at a temperature of 1100° C. for 12 hours. After calcining, the calcined powder was taken out from the furnace and then mixed again.

Successively, the calcined powder, which had been mixed again, was placed into the furnace and subjected to second firing at a temperature of 1100° C. for 6 hours. After calcining, the calcined powder was taken out from the furnace and then mixed again.

In further succession, the calcined powder, which had been mixed again, was placed into the furnace and subjected to third calcining at a temperature of 1100° C. for 6 hours. At this time, the powder, to which calcining at a temperature of 1100° C. had finished, was immediately taken out from the electric furnace, and then allowed to cool at room temperature in the air, thereby obtaining an active material of Example 21.

In Example 22, to a mixture obtained by re-pulverization and mixing after preliminary calcining, first calcining was similarly performed at a temperature of 1200° C. for 6 hours. After calcining, the calcined powder was taken out from the furnace and then mixed again.

Successively, the calcined powder, which had been mixed again, was placed into the furnace and subjected to second calcining at a temperature of 1200° C. for 12 hours. At this time, the powder to which calcining at a temperature of 1200° C. had finished, was immediately taken out from the electric furnace and allowed to cool at room temperature in the air, thereby obtaining an active material of Example 22.

Comparative Example 1

In Comparative Example 1, a monoclinic composite oxide $TiNb_2O_7$ was synthesized using a method similar to the method described in Jpn. Pat. Appln. KOKAI Publication No. 2012-99287.

Specifically, the synthesis was performed as follows. First, a titanium oxide powder and a niobium pentoxide powder were weighed at a molar ratio of 1:1. The weighed raw material powders were put into a mortar. Ethanol was added to the mortar, and then wet mixing was performed. The mixture thus obtained was put into a platinum crucible, calcined at a temperature of 1100° C. continuously for 20 hours, and after that, the calcined mixture was cooled slowly in the furnace, whereby an active material in Comparative Example 1 was obtained. At this time, about three hours was spent to reduce the in-furnace temperature of the box-type muffle furnace from 1100° C. to 100° C.

Comparative Example 2

In Comparative Example 2, raw material powders were mixed at a mixing ratio similar to that in the method described in Example 1. After the thus obtained mixture was calcined at a temperature of 1100° C. continuously for 20 hours as in Comparative Example 1, the calcined mixture was cooled slowly in the furnace, whereby an active material in Comparative Example 2 was obtained.

Comparative Example 3

In Comparative Example 3, a raw material powders were mixed at a mixing ratio similar to that in the method described in Example 1. The mixture was preliminarily calcined at a temperature of 850° C. for 6 hours. Subsequently, a preliminarily calcined powder was taken out from the furnace, pulverized again, and then, further mixed.

To the thus obtained mixture, first calcining was successively performed at a temperature of 1100° C. for 6 hours. After calcining, the calcined powder was taken out from the furnace and then mixed again.

Successively, the calcined powder, which had been mixed again, was placed into the furnace and subjected to second calcining at a temperature of 1100° C. for 6 hours. After calcining, the calcined powder was taken out from the furnace and then mixed again.

In further succession, the calcined powder, which had been mixed again, was placed into the furnace and subjected to third calcining at a temperature of 1100° C. for 12 hours. After that, the calcined powder was cooled slowly in the furnace without being immediately taken out from the electric furnace, whereby an active material in Comparative Example 3 was obtained.

Comparative Example 4

In Comparative Example 4, raw material powders were mixed at a mixing ratio similar to that in the method described in Example 1. First, the mixture was preliminarily calcined at a temperature of 850° C. for 6 hours. Subsequently, the preliminarily calcined powder was taken out from the furnace, pulverized again, and then, further mixed.

To the thus obtained mixture, first calcining was successively performed at a temperature of 1100° C. for 6 hours. After calcining, the calcined powder was taken out from the furnace and then mixed again.

Successively, the calcined powder, which had been mixed again, was placed into the furnace and subjected to second calcining at a temperature of 1100° C. for 6 hours. After calcining, the calcined powder was taken out from the furnace and then mixed again.

In further succession, the calcined powder, which had been mixed again, was placed into the furnace and subjected to third calcining at a temperature of 1100° C. for 12 hours. After that, the calcined powder was cooled slowly in the furnace, and then again at 600° C. for 6 hours, an annealing treatment was performed, whereby an active material in Comparative Example 4 was obtained.

The synthesis conditions for the active materials in Comparative Examples 1 to 4 are summarized in the following Tables 5 and 6.

above. Thus, an X-ray diffraction pattern of each of the active materials obtained in Examples 1 to 22 and Comparative Examples 1 to 4 was obtained. For the measurement, each active material was pulverized until the average particle diameter of a sample of the active material was reduced to approximately 10 μm.

As a result of analyzing the results of the powder X-ray diffraction method by the Rietveld method, it was found that the active materials obtained in Examples 1 to 22 and Comparative Examples 1 to 4 were each a monoclinic composite oxide having a crystal structure which is the same as or similar to the crystal structure of monoclinic composite oxide shown in FIGS. 1 and 2. As a result of refining the lattice constant by the Rietveld method, it was found that all the lattice volumes (a-axis lattice constant×b-axis lattice constant×c-axis lattice constant) obtained in Examples 1 to 22 were larger than the lattice volume obtained in Comparative Example 1. This is considered to be because a monovalent element (M(I)) having a large ionic radius was substituted into the structure. Further, it was found that in all the samples obtained in Examples 1 to 22, all elements including substituent elements were uniformly and randomly arranged among each of the crystal sites. This is

TABLE 5

| | Composition | Ti source (mixing ratio) | Nb source (mixing ratio) | M(I) source (mixing ratio) | M(V) source (mixing ratio) | M(VI) source (mixing ratio) | M(IV) source (mixing ratio) |
|---|---|---|---|---|---|---|---|
| Comparative Example 1 | $Nb_2TiO_7$ | $TiO_2$ (1.0) | $Nb_2O_5$ (1.0) | — | — | — | — |
| Comparative Example 2 | $Nb_{2.0}Ti_{0.9}(Nb_{0.75}Na_{0.25})_{0.1}O_7$ (y = 0.1) | $TiO_2$ (1.0) | $Nb_2O_5$ (1.153) | $Na_2CO_3$ (0.0139) | Summed up in Nb source | — | — |
| Comparative Example 3 | $Nb_{2.0}Ti_{0.9}(Nb_{0.75}Na_{0.25})_{0.1}O_7$ (y = 0.1) | $TiO_2$ (1.0) | $Nb_2O_5$ (1.153) | $Na_2CO_3$ (0.0139) | Summed up in Nb source | — | — |
| Comparative Example 4 | $Nb_{2.0}Ti_{0.9}(Nb_{0.75}Na_{0.25})_{0.1}O_7$ (y = 0.1) | $TiO_2$ (1.0) | $Nb_2O_5$ (1.153) | $Na_2CO_3$ (0.0139) | Summed up in Nb source | — | — |

TABLE 6

| | Whether preliminary calcining has been performed | Conditions of preliminary calcining (temperature/time) | Calcining Temperature | Calcining time $1^{st}/2^{nd}/3^{rd}$ (h) | Cooling condition or heat treatment condition |
|---|---|---|---|---|---|
| Comparative Example 1 | not performed | — | 1100° C. | 201/—/— | cooling outside of furnace |
| Comparative Example 2 | not performed | — | 1100° C. | 20/—/— | cooling outside of furnace |
| Comparative Example 3 | performed | 850° C./6 hours | 1100° C. | 6/6/12 | cooling outside of furnace |
| Comparative Example 4 | performed | 850° C./6 hours | 1100° C. | 6/6/12 | 600° C. annealing |

(Composition Analysis)

The compositions of the active materials obtained in Examples 1 to 22 and Comparative Examples 1 to 4 were analyzed by ICP. As a result, it was confirmed that the element ratios were the same as the intended element ratios described in Tables 1, 3, and 5.

(Powder X-Ray Diffraction Measurement)

The active materials obtained in Examples 1 to 22 and Comparative Examples 1 to 4 were measured by a powder X-ray diffraction method using Cu-Kα rays, as described presumed to be a result of cooling outside the furnace from the firing temperature, by which a state where constituent elements are randomized due to thermal vibration, that is, a state in which arrangement of the constituent elements is governed by entropy had been maintained.

Meanwhile, as a result of Rietveld analysis, it was found that in the samples obtained in Comparative Examples 2 to 4, various elements are unevenly distributed and biased towards part of the crystal lattice. This is presumed to be a result of cooling inside the furnace or performing annealing treatment after firing, by which, arrangement of the elements in the crystal structure had been governed by entropy all of these. Note that the active material obtained in Comparative Example 1 includes no substituent element.

(TEM-EDX Measurement)

The active materials obtained in Examples 1 to 22 and Comparative Examples 1 to 4 were subjected to TEM-EDX measurement, as described above. As a result, it was found that in the active materials obtained in Examples 1 to 22, a solid solution had been produced where all the metal elements M, with which Nb or Ti had been substituted, had randomly entered the crystal sites in the crystal lattice of the monoclinic composite oxide $TiNb_2O_7$ at uniform proportions.

On the other hand, although production of a solid solution was similarly confirmed also for the active materials obtained in Comparative Examples 2 to 4, the result of a scanning transmission electron microscopy (STEM) method suggested that the metal elements M were unevenly distributed and biased towards part of the sites in the crystal structure. Note that the active material obtained in Comparative Example 1 does not include the metal element M.

Electrochemical Measurement

Example 1

10 parts by mass of acetylene black as a conductive agent was mixed with 100 parts by mass of the active material obtained in Example 1 to obtain a mixture. Then, the mixture was dispersed in N-methyl-2-pyrrolidone (NMP) to obtain a dispersion liquid. 10 parts by mass of polyvinylidene-fluoride (PVdF) as a binder was mixed with this dispersion liquid based on 100 parts by mass of the active material to produce an electrode slurry. The slurry was applied onto a current collector formed of aluminum foil using a blade. The slurry on the current collector was dried at 130° C. for 12 hours under vacuum to obtain an electrode.

The electrochemical measurement cell of Example 1 was manufactured using the above electrode, metal lithium foil as a counter electrode, and nonaqueous electrolyte. As the nonaqueous electrolyte, a nonaqueous electrolyte in which lithium hexafluorophosphate ($LiPF_6$) was dissolved at a concentration of 1 M in a mixed solvent (volume ratio 1:1) of ethylene carbonate and diethyl carbonate was used.

The electrochemical measurement cell of Example 1 was subjected to charge and discharge test at room temperature. The charge and discharge test was conducted at a charge-and-discharge current value of 0.2 C (discharge rate) within a potential range of 1.0 V to 3.0 V relative to the metallic lithium electrode. At this time, an initial discharge capacity was measured. The initial discharge capacity in Example 1 was 278 mAh/g.

Then, for the electrochemical measurement cell of Example 1, the discharge capacity (0.2 C discharge capacity) at a discharge current of 0.2 C and the discharge capacity (5.0 C discharge capacity) at a discharge current of 5.0 C were measured. By dividing the 5.0 C discharge capacity, which was obtained by measurement, by the 0.2 C discharge capacity, which was similarly obtained by measurement, a 5.0 C discharge capacity/0.2 C discharge capacity ratio was calculated. A 5 C discharge capacity retention ratio (vs. 0.2 C capacity) thus obtained is indicative of rate performance.

In order to examine whether the active material obtained in Example 1 can be charged and discharged stably, for the electrochemical measurement cell of Example 1, charging and discharging were repeated for 100 cycles. One cycle was set to be charging once and discharging once. Charging and discharging were performed at room temperature at a current value of 1 C (discharge rate) within a potential range of 1.0 V to 3.0 V relative to the metallic lithium electrode.

The discharge capacity retention ratio after 100 cycles was examined as follows. For the electrochemical measurement cell of Example 1, after charging and discharging were repeated for 100 cycles, charging and discharging were performed again at 0.2 C (time discharge rate), and thus the discharge capacity after 100 cycles was obtained. The discharge capacity retention ratio was calculated, setting the initial discharge capacity as 100%. That is, by dividing a value of the discharge capacity after 100 cycles by a value of the initial discharge capacity, the discharge capacity retention ratio after 100 Cycles was calculated. The discharge capacity retention ratio thus obtained is indicative of cycle performance of the active material, that is, life performance.

Examples 2 to 22 and Comparative Examples 1 to 4

As with the active material obtained in Example 1, electrochemical measurement cells of Examples 2 to 22 and Comparative Examples 1 to 4 were manufactured using the active materials obtained in Examples 2 to 22 and the active materials obtained in Comparative Examples 1 to 4. For the electrochemical measurement cells of Examples 2 to 22 and Comparative Examples 1 to 4, measurement was performed in the same manner as in the electrochemical measurement for the electrochemical measurement cell of Example 1. The results are shown below in Table 7.

TABLE 7

| | Initial discharge capacity (mAh/g) | 5.0 C discharge capacity/0.2 C discharge capacity ratio (%) | Discharge capacity retention ratio after 100 cycles (%) |
|---|---|---|---|
| Example 1 | 278 | 89.5 | 85.3 |
| Example 2 | 273 | 92.1 | 83.1 |
| Example 3 | 258 | 81.6 | 74.9 |
| Example 4 | 272 | 85.4 | 83.2 |
| Example 5 | 270 | 83.1 | 86.0 |
| Example 6 | 269 | 88.6 | 84.7 |
| Example 7 | 265 | 81.3 | 80.4 |
| Example 8 | 267 | 90.1 | 85.5 |
| Example 9 | 259 | 80.8 | 79.4 |
| Example 10 | 255 | 91.9 | 75.1 |
| Example 11 | 266 | 88.5 | 81.2 |
| Example 12 | 264 | 87.4 | 78.5 |
| Example 13 | 270 | 88.7 | 83.8 |
| Example 14 | 273 | 90.2 | 86.2 |
| Example 15 | 267 | 86.7 | 85.4 |
| Example 16 | 275 | 89.8 | 86.3 |
| Example 17 | 263 | 90.5 | 80.9 |
| Example 18 | 268 | 89.4 | 82.2 |
| Example 19 | 265 | 90.6 | 83.1 |
| Example 20 | 266 | 90.1 | 82.9 |
| Example 21 | 277 | 89.6 | 85.3 |
| Example 22 | 275 | 88.9 | 84.6 |
| Comparative Example 1 | 251 | 80.3 | 68.5 |
| Comparative Example 2 | 248 | 73.3 | 70.1 |
| Comparative Example 3 | 252 | 80.5 | 72.2 |
| Comparative Example 4 | 257 | 81.0 | 73.8 |

From the results shown in Table 7, it can be seen that the discharge capacities of the electrochemical measurement cells of Examples 1 to 22 are 255 to 278 mAh/g and that these values are equal to or larger than the value of the initial discharge capacity of the electrochemical measurement cell of Comparative Example 1.

Further, it was confirmed that the discharge capacity (the 5.0 C discharge capacity/0.2 C discharge capacity ratio) under a high load condition of 5 C (time discharge rate) for the electrochemical measurement cells of Examples 1 to 22, that is, all the examples was higher than that of Comparative Example 1. Consequently, it is found that the monoclinic composite oxides of Examples 1 to 22 can realize a nonaqueous electrolyte battery whose rate performance is improved as compared to a nonaqueous electrolyte battery using the monoclinic composite oxide of Comparative Example 1.

From the results shown in Table 7, it can be seen that the capacity retention ratio after 100 cycles for the electrochemical measurement cells of Examples 1 to 22, that is, all the examples was more excellent than that of Comparative Example 1. Further, the capacity retention ratio after 100 cycles for the electrochemical measurement cells of Examples 1 to 22 was more excellent than those of Comparative Examples 2 to 3. The enhancement of the capacity retention ratio is considered to be an effect obtained in association with an increase in the lattice volume, as described above.

According to at least one of the embodiments and examples described above, an active material including a monoclinic niobium-titanium composite oxide is provided. In the active material, a portion of niobium or titanium as a constituent element of $Nb_2TiO_7$ is substituted by an element such that any one of the following formulas (1) to (3) is satisfied:

$$Ti(IV) \rightarrow 0.75M(V) + 0.25M(I) \quad (1)$$

$$Ti(IV) \rightarrow 0.6M(VI) + 0.4M(I) \quad (2)$$

$$Nb(V) \rightarrow 0.8M(VI) + 0.2M(I) \quad (3),$$

where M(VI) is at least one of Mo and W, M(V) is at least one of Nb, Ta, and V, and M(I) is at least one of Na, K, Rb, and Cs.

M(VI) may be either one of Mo and W, or a combination of both Mo and W. M(V) may be one of Nb, Ta, and V, or a combination of two or more of Nb, Ta, and V. M(I) may be one of Na, K, Rb, and Cs, or a combination of two or more of Na, K, Rb, and Cs.

Owing to the increase in the lattice volume due to element substitution, this active material can realize a nonaqueous electrolyte battery which can exhibit both excellent rapid charge-and-discharge performances and excellent repetitive charge-and-discharge performances.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An active material comprising a monoclinic niobium-titanium composite oxide in which a portion of niobium (Nb) or titanium (Ti) as a constituent element of $Nb_2TiO_7$ is substituted by an element such that any one of following formulas (1) to (3) is satisfied:

$$Ti(IV) \rightarrow 0.75M(V) + 0.25M(I) \quad (1)$$

$$Ti(IV) \rightarrow 0.6M(VI) + 0.4M(I) \quad (2)$$

$$Nb(V) \rightarrow 0.8M(VI) + 0.2M(I) \quad (3),$$

wherein M(VI) is at least one of Mo and W, M(V) is at least one of Nb, Ta, and V, and M(I) is at least one of Na, K, Rb, and Cs.

2. The active material according to claim 1, wherein the monoclinic niobium-titanium composite oxide is represented by any one of following general formulas (A) to (E):

$$Nb_2Ti_{1-y}(M(V)_{0.75}M(I)_{0.25})_yO_7 \quad (A)$$

$$Nb_2Ti_{1-y}(M(VI)_{0.6}M(I)_{0.4})_yO_7 \quad (B)$$

$$Nb_{2-x}(M(VI)_{0.8}M(I)_{0.2})_xTiO_7 \quad (C)$$

$$Nb_{2-x}(M(VI)_{0.8}M(I)_{0.2})_xTi_{1-y}(M(V)_{0.75}M(I)_{0.25})_yO_7 \quad (D)$$

$$Nb_{2-x}(M(VI)_{0.8}M(I)_{0.2})_xTi_{1-y}(M(VI)_{0.6}M(I)_{0.4})_yO_7 \quad (E),$$

wherein M(VI) is at least one of Mo and W, M(V) is at least one of Nb, Ta, and V, M(I) is at least one of Na, K, Rb, and Cs, $0<x \leq 1$, and $0<y \leq 1$.

3. The active material according to claim 2, wherein $0<y<1$ in the general formulas (A), (B), (D), and (E).

4. The active material according to claim 2, wherein $0.1 \leq y \leq 0.9$ in the general formulas (A), (B), (D), and (E).

5. The active material according to claim 2, wherein $0.1 \leq x \leq 1.0$ in the general formulas (C), (D), and (E).

6. The active material according to claim 1, wherein the monoclinic niobium-titanium composite oxide is represented by any one of following general formulas (A') to (E'):

$$Li_aNb_2Ti_{1-y}(M(V)_{0.75}M(I)_{0.25})_yO_7 \quad (A')$$

$$Li_aNb_2Ti_{1-y}(M(VI)_{0.6}M(I)_{0.4})_yO_7 \quad (B')$$

$$Li_aNb_{2-x}(M(VI)_{0.8}M(I)_{0.2})_xTiO_7 \quad (C')$$

$$Li_aNb_{2-x}(M(VI)_{0.8}M(I)_{0.2})_xTi_{1-y}(M(V)_{0.75}M(I)_{0.25})_yO_7 \quad (D')$$

$$Li_aNb_{2-x}(M(VI)_{0.8}M(I)_{0.2})_xTi_{1-y}(M(VI)_{0.6}M(I)_{0.4})_yO_7 \quad (E'),$$

where M(VI) is at least one of Mo and W, M(V) is at least one of Nb, Ta, and V, M(I) is at least one of Na, K, Rb, and Cs, $0<x \leq 1$, $0<y \leq 1$, and $0 \leq a \leq 5$.

7. The active material according to claim 6, wherein $0<y<1$ in the general formulas (A'), (B'), (D'), and (E').

8. The active material according to claim 6, wherein $0.1 \leq y \leq 0.9$ in the general formulas (A'), (B'), (D'), and (E').

9. The active material according to claim 6, wherein $0.1 \leq x \leq 1.0$ in the general formulas (C), (D), and (E).

10. The active material according to claim 1, wherein in the monoclinic niobium-titanium composite oxide, a portion of the titanium is substituted by at least one of Zr, Hf, Ge, and Sn.

11. The active material according to claim 1, wherein the monoclinic niobium-titanium composite oxide, a portion of the titanium is substituted by at least one of Zr, Hf, and Ge, such that an amount of substitution with respect to Ti sites of a crystal structure of the monoclinic niobium-titanium composite oxide is half or less.

12. A nonaqueous electrolyte battery comprising:
a negative electrode comprising the active material according to claim 1;
a positive electrode; and
a nonaqueous electrolyte.

13. A battery pack comprising the nonaqueous electrolyte battery according to claim 12.

14. The battery pack according to claim 13, wherein the battery pack further comprises a protective circuit and an external power distribution terminal.

15. The battery pack according to claim 13, wherein the battery pack comprises a plurality of the nonaqueous electrolyte batteries, wherein the plural nonaqueous electrolyte batteries are electrically connected in series, in parallel, or in a combination of in series and in parallel.

16. A vehicle onto which is mounted the battery pack according to claim 13.

17. The vehicle according to claim 16, wherein the battery pack is configured to recover a regenerative energy of a power of the vehicle.

* * * * *